United States Patent [19]

Clark

[11] Patent Number: 4,808,993

[45] Date of Patent: Feb. 28, 1989

[54] ELECTRONIC SECURE ENTRY SYSTEM, APPARATUS AND METHOD

[75] Inventor: Keith S. Clark, Sunnyvale, Calif.

[73] Assignee: DataTrak, Inc., Mountain View, Calif.

[21] Appl. No.: 105,484

[22] Filed: Sep. 30, 1987

Related U.S. Application Data

[60] Continuation of Ser. No. 864,806, Jul. 14, 1986, abandoned, which is a division of Ser. No. 661,343, Oct. 16, 1984, Pat. No. 4,609,780, which is a continuation-in-part of Ser. No. 537,425, Sep. 29, 1983, abandoned.

[51] Int. Cl.⁴ .......................... H04M 11/00; G06K 7/08

[52] U.S. Cl. .......................... 340/825.31; 379/103; 235/449

[58] Field of Search .......................... 379/103; 340/825.31, 340/825.32, 825.33, 825.34; 235/492, 493, 494, 487

[56] References Cited

U.S. PATENT DOCUMENTS 3,943,335 3/1976 Kinker et al. .............. 340/825.33 X 4,507,550 3/1985 Fleer .............................. 235/487 X

*Primary Examiner*—James L. Dwyer

*Attorney, Agent, or Firm*—Flehr, Hohbach, Test, Albritton & Herbert

[57] ABSTRACT

Card for use in a security system having at least two rows of spaced apart metallic elements with a predetermined arrangement so that the metallic elements are encoded with a non-erasable code. An opaque material encases the metallic elements to form a card-like member and to make the metallic elements invisible to the human eye.

Method for forming a card for use in a security system which comprises a metallic planar sheet and removing material from the sheet to provide a plurality of metallic elements arranged in at least two rows. At least portions of at least certain of the metallic elements are removed to place a unique code in the elements. The elements are then encased in an opaque material to form a card-like member and to conceal the metallic elements from the human eye.

17 Claims, 12 Drawing Sheets

ELECTRONIC SECURE ENTRY SYSTEM, APPARATUS AND METHOD

This is a continuation of application Ser. No. 864,806 filed July 14, 1986 now abandoned, which is a divisional of application Ser. No. 661,343, filed on Oct. 16, 1984 now U.S. Pat. No. 4,609,780 which is a continuation-in-part of application Ser. No. 537,425, filed Sept. 29, 1983 now abandoned.

This invention relates to an electronic secure entry system, apparatus and method and more particularly to one which can be utilized by realtors in showing homes and places of business in which an electronic lock box or key safe can be provided as a safe or secure receptacle for the key(s) to obtain access to the buildings to be shown. It also relates to such a system, apparatus and method which can be used in other applications where limited access is desired as, for example, file cabinets, special areas or rooms and vehicles.

Lock boxes and key safes have heretofore been provided as, for example, of the type disclosed in U.S. Pat. No. 3,436,937. Such key safes or lock boxes have security problems associated with them. One principal security problem is that once a realtor loses a key by which he obtains access to the key safes or lock boxes and it is found, access can be obtained to many hundreds if not thousands of lock boxes or key safes, particularly in a large real estate multiple listing system. Another security problem which is present in the existing system is there is no record of which sales agent for a sales agency in a multiple listing service entered a building. This makes it difficult, if not impossible, to track down who may have been responsible for thefts from the houses or doors being left open. There is therefore a need for a new and improved security system, apparatus and method which overcomes these disadvantages.

In general it is an object of the present invention to provide an electronic secure entry system, apparatus and method which can be used by realtors to provide entry to selected personnel to facilities and equipment using key-type access such as file cabinets, storage areas, warehouse facilities, homes, vehicles and the like.

Another object of the invention is to provide a system, apparatus and method of the above character which can be used by realtors in multiple listing systems.

Another object of the invention is to provide a system, apparatus and method of the above character in which the use of a mechanical key to obtain access to a lock box or key safe is eliminated.

Another object of the invention is to provide a system, apparatus and method of the above character in which a record is made of users such as real estate salesman gaining access to the system, apparatus and method.

Another object of the invention is to provide a system, apparatus and method of the above character which utilizes first and second identifiers in the form of first and second codes to gain access.

Another object of the invetnion is to provide a system, apparatus and method of the above character in which the first code is an assigned code and the second code is one selected by the user.

Another object of the invention is to provide a system, apparatus and method of the above character which limits access to users who have the first and second code.

Another object of the invention is to provide a system, apparatus and method of the above character in which a lock box or key safe is provided in which access to the key(s) in the lock box or key safe can only be obtained by the use of the first and second codes.

Another object of the invention is to provide a system, apparatus and method of the above character in which the first and second codes are inserted by the use of keyboard means in the form of a key pad carried by the lock box or key safe.

Another object of the invention is to provide a system, apparatus and method in which the lock box or key safe can be interrogated to supply information regarding the users obtaining access to the lock box or key safe.

Another object of the invention is to provide a lock box which will give a tone each time a key of a key pad is depressed.

Another object of the invention is to provide a system, apparatus and method of the above character in which a retainer in the form of a shackle movable between latched and unlatched positions is provided.

Another object of the invention is to provide a system, apparatus and method of the above character in which a key compartment is provided as a part of the lock box or key safe and is mounted for movement between key retaining and key access positions.

Another object of the invention is to provide a system, apparatus and method of the above character in which a separate electromechanical latches are provided for the for the key compartment and for the retainer.

Another object of the invention is to provide a system, apparatus and method of the above character in which each of the electromechanical latches are operated by separate and independent codes.

Another object of the invention is to provide a system, apparatus and method of the above character in whicha central station is used and which is provided with a control unit.

Another object of the invention is to provide a system, apparatus and method of the above character in which the control unit can be interrogated by a user to obtain his assigned code.

Another object of the invention is to provide a system, apparatus and method of the above character in which the code of an interrogating user can be verified.

Another object of the invention is to provide a system, apparatus and method of the above character in which the lock box or key safe and the control unit at the central station are provided with independently synchronized timing means.

Another object of the invention is to provide a system, apparatus and method of the above character in which codes are changed under the control of the timing means.

Another object of the invention is to provide a system, apparatus and method of the above character in which voice synthesizers are utilized for supplying codes to users.

Another object of the invention is to provide a system, apparatus and method of the above character in which the timing means of the lock boxes and the timing means in the control unit are generally at the same time.

Another object of the invention is to provide a system, apparatus and method of the above character in which algorithms determine the access codes for the lock boxes based upon the time of issuance.

Another object of the invention is to provide a system, apparatus and method of the above character in which the user must havein his possession the two separate and independent codes to gain access to the lock box.

Another object of the invention is to provide a system, apparatus and method of the above character in which the first code is assigned and is embodied in a physical device carried by the user.

Another object of the invention is to provide a system, apparatus and method of the above character in which the physical device is in the form of a card carrying the first code.

Another object of the invention is to provide a system, apparatus and method of the above character in which the card utilizes concealed metallic elements arranged in a predetermined manner to provide the first code.

Another object of the invention is to provide a system, apparatus and method of the above character in which the first code carried by the elements can be sensed by causing relative movement between the elements carried by the card and a sensor.

Another object of the invention is to provide a system, apparatus and method of the above character in which the relative movement between the card and the sensor is not time sensitive.

Another object of the invention is to provide a system, apparatus and method of the above character in which the second code can be carried by the card by which it is concealed in a random manner in another code.

Another object of the invention is to provide a system, apparatus and method of the above character in which another code is visible from the exterior of the card.

Another object of the invention is to provide a system, apparatus and method of the above character in which the second code need not be changed.

Another object of the invention is to provide a system, apparatus and method of the above character utilizing a card which is not damaged by scraping or by passing the same through a magnetic field.

Another object of the invention is to provide a system, apparatus and method of the above character in which a single card is utilized for obtaining access to the key and also for the retainer.

Another object of the invention is to provide a system, apparatus and method of the above character which particularly lends itself to use by real estate boards and multiple listing services.

Another object of the invention is to provide a system, apparatus and method of the above character in which centralized control of the entire lockbox network is provided.

Another object of the invention is to provide a system, apparatus and method of the above character in which real estate agent may be readily added, placed on hold, or deleted from the system.

Another object of the invention is to provide a system, apparatus and method of the above character which provides cost effective information.

Another object of the invention is to provide a system, apparatus and method of the above character which provides greatly improved security.

Another object of the invention is to provide a system, apparatus and method of the above character which provides information which is readily available to brokers and to central offices and in which nighttime lockout can be provided for the home owner.

Another object of the invention is to provide a system, apparatus and method of the above character which can be utilized in many different industrial type applications in addition to real estate applications.

Another object of the invention is to provide a system, apparatus and method of the above character which lends itself to many different applications where security is required.

Additional objects and features of the invention will appear from the following description in which the preferred embodiments are set forth in detail in conjunction with the accompanying drawings.

In general, the system, apparatus and method of the present invention utilizes a case. A compartment is mounted in the case for movement between retaining and access positions. An electromagnetic latch is carried by the case and the compartment for latching the compartment in a key retaining position. A retainer is mounted in the case for movement between latched and unlatched positions. An additional electromechanical latch is carried by the case and the retainer for retaining the retainer in a latched position. A power supply is provided in the case. Circuitry connects the power supply and the first named and additional electromechanical latches. A code actuated mechanism is carried by the case and is connected to the circuitry for selective operation of the first named and additional electromagnetic latch mechanisms.

Figure 1:
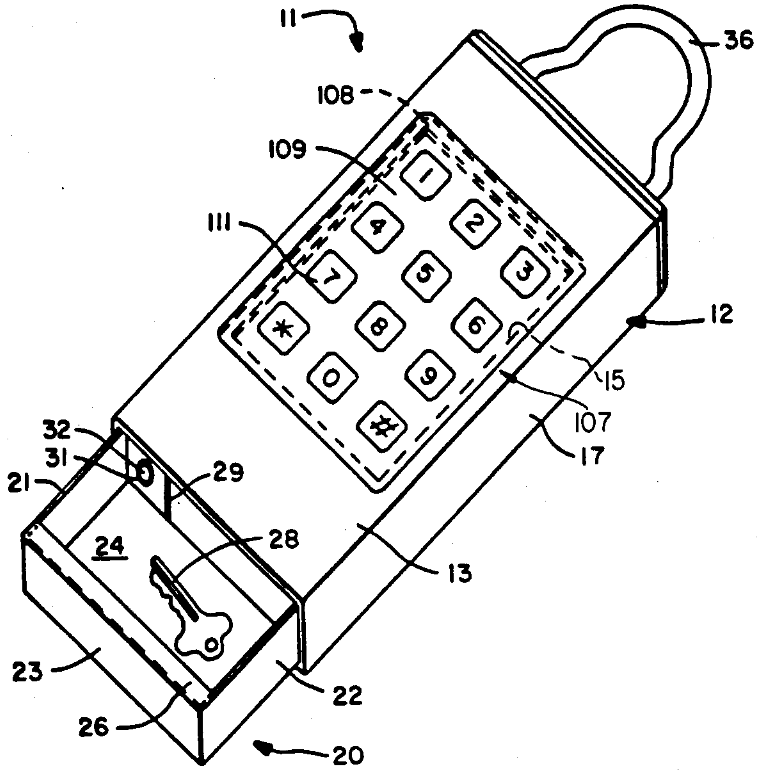
FIG. 1 is an isometric view of a lock box or key safe incorporating the present invention for use with the system and method and shows the key box or key compartment in an open position.
Figure 2:
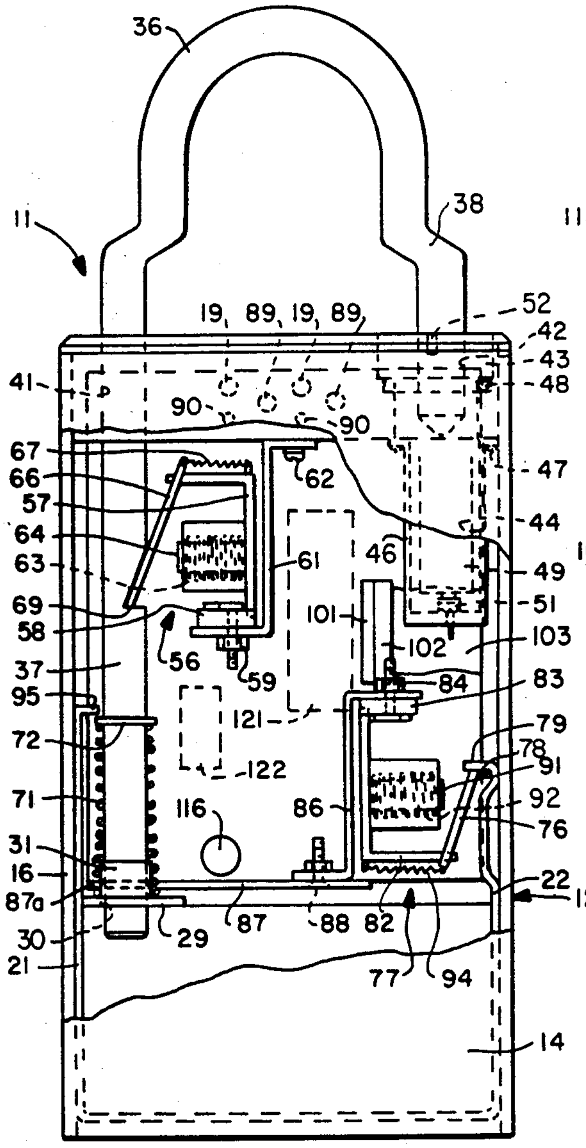
FIG. 2 is a rear elevational view of the lock box or key safe shown in FIG. 1 with certain portions of the case being broken away.
Figure 3:
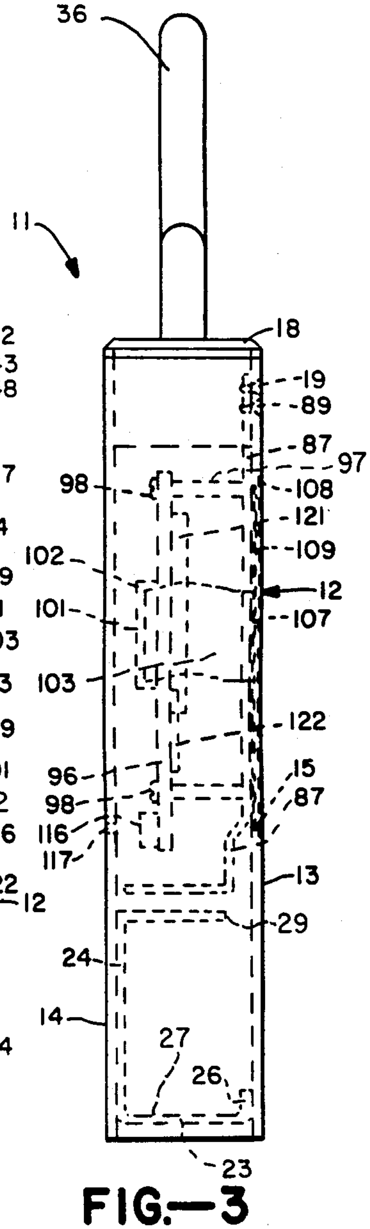
FIG. 3 is a side elevational view of the lock box or key safe shown in FIG. 2.

A lock box or key safe 11 to be utilized in the electronic secure entry system, apparatus and method of the present invention is shown in FIGS. 1 through 3. As shown therein, it consists of a housing or a case 12 which in the embodiment shown is generally rectangular in cross-section and is provided with spaced apart parallel front and rear walls 13 and 14. A large opening 15 is provided in the front wall 13 for a purpose hereinafter described. The case 12 also includes spaced apart parallel side walls 16 and 17. The upper and lower ends of the housing or case 12 are open. The case 12 can have suitable dimensions such as 5.5 inches in height 3.125 inches in width and 1.125 inches in depth. A top cover 18 is seated within and closes the top opening and is secured to the case 12 by suitable means such as pressed-in blind pins 19.

The housing or case 12 is formed of a suitable material such as hardened steel. A key box or compartment 20 is slidably mounted in the housing or case 12 and serves to close the bottom opening in the case 12. The key box or key compartment 20 is also formed of a similar material such as hardened steel. The key box or key compartment 20 consists of first and second spaced apart parallel side walls 21 and 22, a lower or bottom wall 23, a partial rear wall 24 and a relatively small front lip 26. The key box or key compartment 20 is sized in such a manner so that it can slide upwardly into the bottom opening in the case 12 so that the bottom wall 23 is slightly recessed with respect to the lower extremity of the housing or cover 12 so as to form in combination with the case 12 a completely enclosed enclosure. The space 27 in front of the rear wall 24 behind the lip 26 can be utilized for retaining one or more keys 28 in the key box or key compartment 20. A forwardly extending lip 29 is provided which is formed integral with the rear wall 24. The lip 29 also can be secured to the side wall 21 by suitable means such as spot welding. The lip 29 is provided with a hole 30. A sleeve 31 has its lower extremity mounted in the lip 29 and is provided with a hole 32 which extends parallel to the side wall 21.

A retainer in the form of a generally U-shaped shackle 36 is provided which has a longer leg 37 and a shorter leg 38. The longer leg 37 is slidably mounted in a hole 41 provided in the top cover 18 and extends downwardly through the hole 32 in the sleeve 31, as shown particularly in FIG. 2. The other shorter leg 38 of the shackle 36 is slidably mounted in an offset hole 42 provided in the cylinder 43. The cylinder 43 is threaded into the top cap 18 and serves as a cover for a battery compartment 44. The battery compartment 44 is provided in a cylindrical block 46 secured to the top cover 18 by screws 47. An 0-ring 48is provided for establishing a seal between the cylinder 43 and the top cover 18. A battery 49 is mounted within the compartment 44 and has its bottom end engaging a spring-urged battery terminal 51 which extends through the bottom wall of the block 46. A tool slot 52 is provided in the cylinder 43 to facilitate insertion and removal of the cylinder from the top cover 18. The slot 52 is of a size so that a coin can be used for rotating the clyinder 43. The cylinder 43 however cannot be removed without the shackle 36 being moved to an out-of-the-way unlocked position because of the offset position of the hole 42.

The shackle 36 is movable between locked and unlocked positions. It is latched into a locked position by electromagnetic means in the form of a relay 56. The relay 56 is of a conventional type and is provided with a generally L-shaped framework 57. The L-shaped framework 57 is supported upon a block 58 of a suitable insulating material such as a ceramic. The block of insulating material is supported by a bolt 59 that is fastened to a generally Z-shaped bracket 61 which is secured to the lower side of the top cover 18 by a screw 62. The block 58 carries terminals (not shown) which are connected to a coil 63 forming a part of the relay 56. The coil 63 is mounted on a magnetic core 64 which is mounted upon the framework 57. A latching member 66 formed of a suitable magnetic material such as steel is hingedly mounted on the L-shaped framework 57 and has its lower extremity as viewed in FIG. 2 yieldably urged in an outward direction by a coil spring 67 havig one end secured to the latching member 66 and having the other end secured to the L-shaped framework 57. Energization of the coil 63 will cause the latch member 66 to be attracted to the core 64 against the force of the spring 67. The latching member 66 is adapted to engage a notch 69 formed in the leg 37 of the shackle 36 to retain the shackle in a locked position as shown in FIG. 2. When the shackle is unlatched by movement of the latching member 66 into engagement with the core 64 of the relay 56, means is provided for yieldably urging the shackle into an unlocked position and consists of a spring 71 which is coaxially disposed on the leg 37 of the shackle 36 and has one end engaging a C-ring 72 mounted in an annular slot (not shown) provided on the leg 37. The other end of the spring 71 fits over the sleeve 31 and engages the lip 29. Thus it can be seen that when the latch member 66 is moved to the unlatched position, the spring 71 will yieldably urge the shackle 36 upwardly out of the case so that the leg 38 will clear the hole 42 and permit the shackle 36 to be rotated so that it can be attached to or detached from a doorknob, gas pipe or other suitable location.

Means is also provided for latching the key box or compartment 20 in a closed, key retaining or locked position and consists of a latch member 76 of additional electromagnetic means in the form of a relay 77. The latch member 76 is adapted to engage a notch 78 formed by a lip or catch member 79 on the sidewall 22 of the key box or compartment 20. The relay 77 can be identical to the relay 56 and is provided with an L-shaped framework 82 which is carried by an insulating block 83. The block 83 is secured by a bolt 84 to a Z-shaped bracket 86. The bracket 86 is secured to a larger L-shaped bracket 87 by a bolt 88. The bracket 87 extends upwardly in the front of the case 12 and is secured to the front side of the top cover within the interior of the case 12 by suitable means such as screws 89. The bracket 87 is formed of a suitable material such as hardened steel and covers the opening 15 in the front wall 13. Small positioning protrusions 90 are provided on the top cover and engage holes provided in the bracket 87. The L-shaped framework 82 carries a core 91 and a coil 92. The latch member 76 is hingedly mounted on the L-shaped framework 82 and is yieldably urged into a latching position to engage the notch 78 by a spring 94 which has one end secured to the latch member 76 and the other end secured to th L-shaped framework 82.

A printed circuit board 96 is mounted on posts 97 carried by the bracket 87 by use of screws 98. The printed circuit board 96 carries circuitry of the type hereinafter described. The printed circuit board is provided with a connector 101 of a female type. A male connector 102 is mounted in the female connector 101 and is connected to a flexible tape cable 103. The flexible tape cable 103 extends sidewardly and upwardly around the side of the bracket 87. The tape cable 103 is formed integral with a keyboard or key pad 107 of the type manufactured and sold by the Brady Corporation of Minneapolis, Minn. under the trademark XYMOX. The keyboard 107 is of a type well known to those skilled in the art and is comprised of two layers of plastic which have silver contacts silk-screened on the inside surfaces of the same and which are hermetically sealed with a spacer sheet of insulating material therebetween with cutouts for key areas. When pressure is applied to a specific region a conductive path is established to the printed circuit board as hereinafter described. The keyboard 107 is mounted upon the front side of the bracket 87 within the opening 15 in the front wall 13 by suitable means such as an adhesive. A face plate 109 formed of a suitable flexible material such as a stainless steel sheet is disposed in a recess 108 in the front wall 13 and is secured to the inner margins of the wall 13 defining the opening 15 in the front wall 13 by suitable means such as an epoxy. The face plate 109 covers the opening 15 in the front wall 13 and overlies the keyboard 107. The face plte 109 is provided with graphics in the form of indicia 111 imprinted therein as shown particularly in FIG. 1 which serve as keys that correspond generally to the twelve push buttons on a conventional telephone and carry the numbers 0–9 and the star and a number sign.

Means is provided for preventing the key box or key compartment 25 from being retracted or pushed out of the case 12 and consists of a lip 95 which is carried by the side wall 21 which is adapted to engage a sidewardly extending portion 87*a* of the bracket 87. Thus it can be seen that when the latch member 76 is retracted, the spring 71 engaging the lip 29 will push the key compartment or key box 20 outwardly to the open position shown in FIG. 1 to permit the access to the key or keys 28 contained therein. The lip 95 prevents projection of the key compartment or box beyond a predetermined position as shown in FIG. 1.

A small piezoelectric acoustical transducer 116 is provided which is connected to the printed circuit board and is secured to the bracket 87 beneath the printed circuit board 96 and overlies a hole 117 provided through the rear wall 14 of the case 12 and extending through the bracket 87 so that sound waves produced by the transducer 116 can pass through the hole 117.

Figure 4:
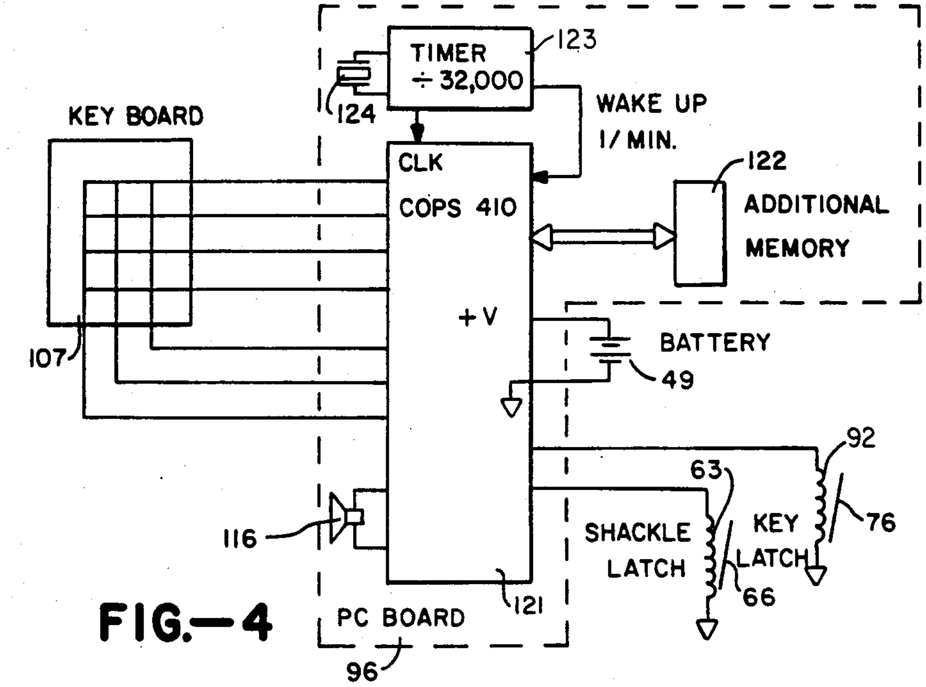
FIG. 4 is a schematic diagram of the circuitry utilized in the lock box or key safe.

The circuitry which is used in the lock box or key safe 11 is shown in FIG. 4. The circuitry which is provided on the printed circuit board 96 is enclosed within the broken line 96 shown in FIG. 4. Those components which are not on the printed circuit board are outside of the broken lines and include the key pad 107, the coils 63 and 92 and the battery 49. An integrated circuit 121 is mounted on the PC board 96 and is of a suitable type such as a COPS 410 manufactured by National Semiconductor which serves as a microcontroller. This microcontroller is provided with additional memory 122 such as the No. 6514 made by Harris Semiconductor which provides an additional 256 bytes of random access memory. A timer chip 123 is also connected to the integrated circuit 121 and by way of example can be of a type manufactured by National Semiconductor utilizing a CMOS timer chip. The timer chip 123 is coupled to a crystal 124 of a suitable frequency as, for example, 32 megahertz. The timer divides the crystal frequency by 32000 to provide a wakeup signal to the microcontroller 121 of once per minute in order to keep track of the current time.

Figure 5:
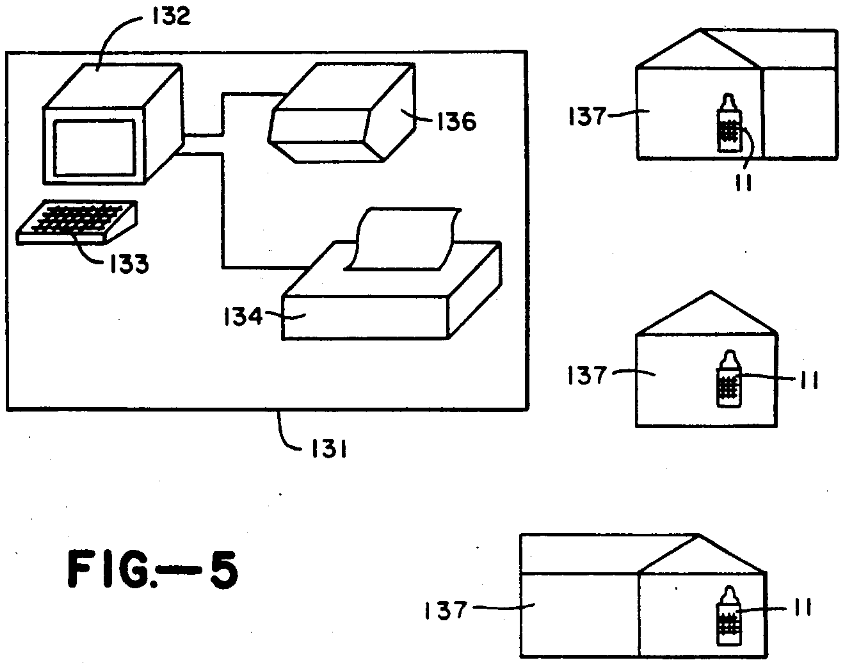
FIG. 5 is a block diagram of an electronic secure entry system incorporating the present invention and utilizing the method of the present invention.

Operation of the lock box or key safe 11 hereinbefore described may now be briefly described in conjunction with the system and method of the present invention. Let it be assumed by way of example that a multiple listing service has, for example, as many as 10,000 real estate brokers desirous of utilizing the system. Such a system would include a control location or station such as in the headquarters of a multiple listing service as represented by the block 131 in FIG. 5. As shown in FIG. 5, the multiple listing service headquarters or control location would typically include a computer 132 with its keyboard 133. The computer would be connected to a conventional printer 134 and in addition to a control console or station 136.

The multiple listing service would have a plurality of the lock boxes 11 which would be given to the listing agents. The listing agents in turn would utilize them in connection with the buildings or houses 137 which are listed with the multiple listing service.

Figure 6:
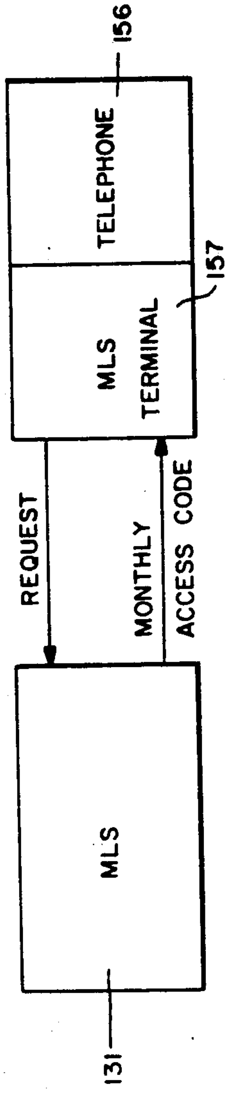
FIG. 6 is a block diagram representing schematically how monthly access codes are provided in the electronic secure ent,ry system and method of the present invention.
Figure 7:
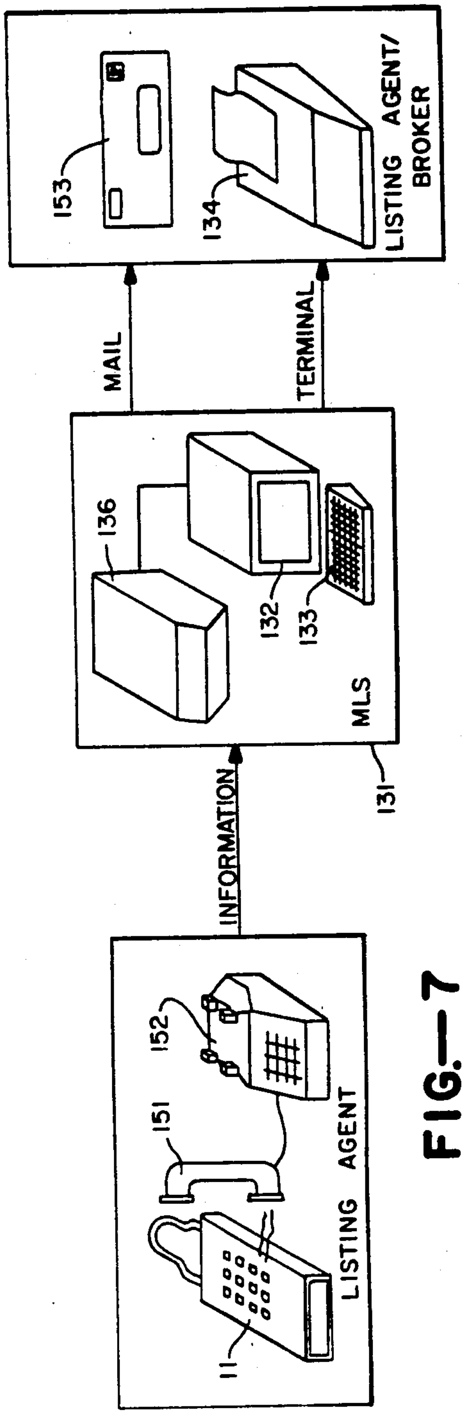
FIG. 7 is another block diagram showing the manner in which the electronic secure entry system is utilized in conjunction with the method of the present invention.

In FIG. 6 there is shown a block diagram of how a real estate agent wculd utilize the present system and method in conjunction with the lock box or key safe 11. FIG. 7 shows the manner in which the listing broker would utilize a lock box or key safe in conjunction with the present system and method.

Figure 8:
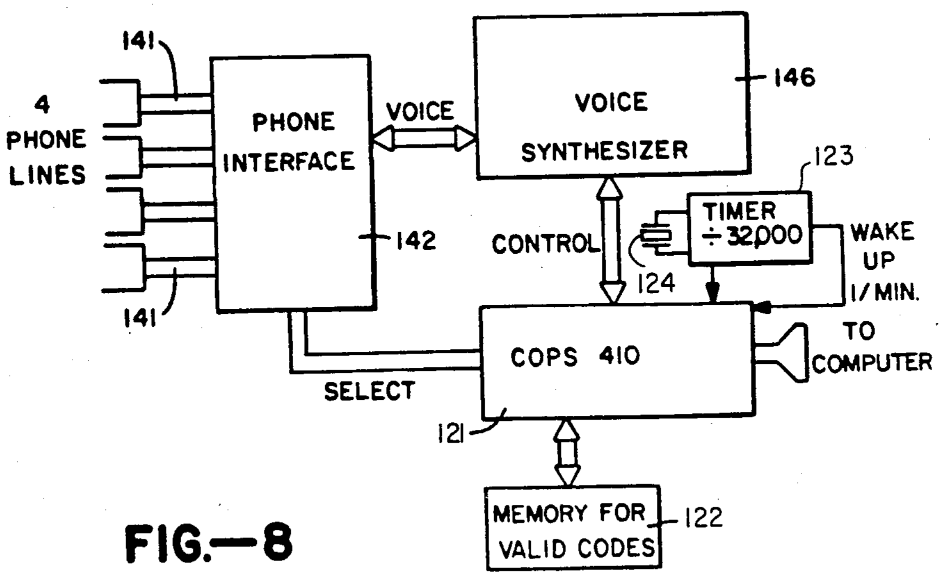
FIG. 8 is a block diagram of the circuitry utilized in the control console in the central location.

In FIG. 8 there is shown the electronic circuitry which would be provided in the control console or station 136 provided at the multiple listing service. As shown therein, typically four incoming telephone lines 141 would be provided for a multiple listing service having as many as 10,000 brokers. These four telephone lines would be connected to a conventional phone interface provided by Mitel. The telephone interface 142 is connected to an integrated microcontroller or microprocessor chip 121 of the type hereinbefore described, namely, a COPS 410 manufactured by National Semiconductor. This COPS 410 has access to the additional memory 122 which includes in its memory a memory for codes which are required to obtain access to the system.

The integrated circuit 121 is connected to the computer 132 at the multiple listing service control center as shown in FIG. 5. The integrated circuit 121 is also connected to a voice synthesizer 146. The voice synthesizer 146 is of a conventional type such as a National Semiconductor DT 1000 chip set which is provided with a standard microprocessor interface which is utilized to determine what words are spoken. The voice synthesizer 146 basically has a digital select input and an analog voice output.

The system and method of the present invention is based upon key codes consisting of 9 digits with the first 5 digits being the permanent identification code for the real estate broker and the other four digits being a private code which is periodically changed as hereinafter described. Typically a broker for a multiple listing service will be assigned his specific five-digit code as, for example, on a small identification card together with a four digit private code known only to the real estate broker which permits him to obtain access to all of the lock boxes 11 for houses in the multiple listing service for that particular month.

Let it be assumed that a broker has been issued the two codes with 9 digits and that it is desired to show a prospective buyer into one of the homes or buildings 137 in the multiple listing service which has been provided with a key lock or safe 11 of the type hereinbefore described by the listing broker. Such a key lock or safe 11 typically can be locked and retained thereby onto the doorknob on the outside of the entrance door to the home. Alternatively, it can be mounted on the gas pipe next to the gas meter for the home.

The broker then uses two codes provided on his identification card and inserts the two codes into the lock box or key safe by depressing the indicia 111 on the keys of the key pad 107 in the order that they appear in his code. Thus the five digit code and the four digit code are entered sequentially. Each time a key is depressed, an audible signal will be produced by the transducer 116 to verify that he has, in fact, pressed a key. When the proper sequence of keys has been entered, the microcontroller supplies electrical energy to the coil 92. At the same time energy is supplied to the transducer 116 to supply an audible tone for a period of three seconds. During this time, the real estate broker can obtain access to the key compartment by pressing upwardly on the key compartment to permit the latch member 76 to become frictionally disengaged from the notch 78 and to be pulled over to the core 91 of the relay 77. The movement of the box by the real estate agent reduces the frictional engagement between the latch member 76 and the catch member 79. As soon as this occurs, the key box or key compartment 20 will be urged outwardly under the force of the spring 91 until the lip 95 comes into engagement with bracket portion 87*a*. By this time, the real estate agent then will have access to the key 28. If by chance, the real estate agent does not press upwardly on the key box or key compartment 20 during the three second interval during the time when the audible tone is being given, the coil 92 will be deenergized and the latch member 76 will reengage the notch 78. It then will be necessary for the real estate agent to again insert his code to obtain reenergization of the coil 92. Thereafter, the real estate agent will have another opportunity in which to have the key compartment or box 20 open under the force of the spring 71.

After the real estate agent has obtained access to the key, the real estate agent can show the prospective purchaser the home on which the lock box 11 is located. After the showing has been completed, the real estate agent again places the key 28 in the lock box and pushes the lock box upwardly into the case 12 until the latch member 76 snaps into the notch 78. The key will then thus again be locked within the case and access cannot be obtained to the same unless it is obtained by the same or another real estate agent using his assigned codes to obtain access to the lock box.

The lock box 11 is provided with an algorithm which when a real estate agent obtains access to the box 11 causes to be recorded in the memory of the integrated circuit 121 or in the additional memory 122, the codes of the agent and the time that the agent obtained access to the lock box.

Now let it be assumed that the listing agent who placed the lock box on the home being shown desires to make a survey of the real estate agents who have shown the home. This can be accomplished by the listing real estate agent going to the lock box 11 and inserting his five digit code and thereafter the four digit code assigned to him in conjunction with the particular lock box. As these codes are being entered, audible tones are again given by the transducer 116 to indicate when a key has been pressed. When the proper codes have been inserted, an electrical signal will be supplied to the coil 63. Again an audible tone will be given off for a period of three seconds during which time, the real estate agent can grasp the case with one hand and hold the shackle 36 with the other hand to slightly depress the shackle to release the latch member 66 and to permit it to move toward the magnet core 64 to release the leg 37 of the shackle 36. The shackle 36 then will be moved upwardly by the force of the spring 71 engaging the C-ring 72. As the shackle 36 is moved upwardly, the short leg 38 will clear the hole 42 and permit the shackle to be swung to permit release of the lock box 11 from the doorknob or pipe or other object to which it is attached.

After the shackle 36 has been released in this manner, the listing real estate agent or broker can take the lock box and go to the nearest telephone. This mode of operation is shown in FIG. 7 in which the lock box 11 is shown being placed close to a receiver 151 of a conventional telephone 152 which is in communication with the multiple listing service 131. By placing the receiver 151 near the small opening 117 provided in the rear of the case 12, the information carried in the memory of the integrated circuit and the additional memory 122 can be released merely by pressing the star and number keys of the indicia 111 which will cause the information contained therein to be passed over the telephone line to the control console or box 136 at the multiple listing service 131 after which it is fed into the computer 132. The information which is received by the computer 132 can be printed out in a conventional printer 134 and then mailed out to the real estate broker. Alternatively, the information on the computer can be sent to a printer to the office of the listing real estate broker as indicated by the printer 153. In this way it is possible for a listing real estate broker to see what activity is being given to the listed home. In addition, in the event that objects are missing and/or doors left open it is possible to trace which broker or agent entered the house at which particular time.

By way of example, the memory carried in the lock box 11 is adequate to carry 64 entries. If information is not erased, the earliest broker entering the house will be erased and the latest broker will be entered with always at least the last 64 real estate agents to enter the house being carried by the memory.

The lock box has been designed in such a manner that it can operate for a period of two years before the battery needs replacement. This two-year period is based on four key box accesses per day and one shackle access per week. When a shackle has been accessed and if a battery is relatively low, as for example, with only three months of lifetime left, an audible beep will be supplied through the speaker 116 to advise the listing agent that the battery should be replaced.

Because of the timers 123 provided with each of the lock boxes, each lock box knows the month, the week, the day of the week and the nearest minute in each day. The same is true with respect to the timer provided in the integrated circuit for the control box 136. The lock boxes 11 are provided with an algorithm which is executed whenever codes are entered into the lock box. The lock boxes combine the codes which are entered with the day of the year with the first five digits of the five digit code of the real estate broker and then determine whether the next four digits of the four-digit code are valid. The algorithm provided in the lock box is such that a code is only valid for a limited period of time as, for example, 30 days. After the 30 days elapse, it is necessary for the real estate broker to obtain a new four digit code. This new four digit code can be obtained by the real estate broker by contacting the multiple listing service. This can be accomplished as shown in FIG. 6 by the real estate broker contacting the multiple listing service by telephone 156 or through a terminal 157 and obtaining access to the control console shown in FIG. 8 to obtain the appropriate four digit code for the ensuing 30 days. This is accomplished automatically by the use of the voice synthesizer 146 or by a printout on the terminal 134.

To do this the real estate agent or broker uses a touch tone telephone to call the phone number of the multiple listing service to obtain access to the control console and thereafter enters his five-digit identification code through the touch tone telephone. If the proper codes have been inserted, the new four-digit access code is spoken by the voice synthesizer 146 and can be written down by the real estate agent. If the real estate agent has access to a multiple listing service terminal 157, the access code can be obtained by entering his identification codes and then the access code is given on the terminal 137 directly to the real estate broker.

From the foregoing it can be seen that an apparatus, system and method has been provided which provides authorized home entry upon the entry of a code into a lock box or key safe. A destruction proof lock box holds the key. With the present system, additional sales agents can be entered rapidly by providing them with identification codes. Similarly, removal of a sales agent, when necessary, can be accomplished rapidly by removal of his codes from the control console. When the codes for the brokers are changed in the next period, that broker cannot obtain a new code nor can he thereafter obtain access to the lock boxes because their codes also will hvae been changed. There are no keys to be lost, forgotten or stolen.

With the system and method, a printed record of who entered the home and when is readily provided. This information can be very valuable for follow-up calls and for a review of sales staff activity.

Under the system and method of the present invention, a permanent five-digit code used by only one individual is issued to an authorized sales agent of a multiple listing service. The sales agent receives the four-digit code by calling the multiple listing service computer on any telephone and dialing in his permanent five-digit code. The authorized sales agent will then have access to any home listed and controlled by the multiple listing service.

Each lockbox is identified by a serial number as, for example, on the top cover 18. The shackle code can be selected by the owner so all of one owner's lock boxes can have the same shackle code. The lock boxes can be programmed so that no access can be obtained to the key compartment during certain hours as, for example from 10:00 p.m. to 6:00 a.m. to give home owners certain hours of privacy.

A listing agent in the multiple listing service would typically purchase a lock box or key safe and would receive a special code for the shackle of that lock box. The agent would then locate the lock box at the listing site. The agent would thereafter visit the site periodically to retrieve information from the lock box. The listing agent can retrieve complete entry information simply by calling the multiple listing service computer and holding the lock box to any telephone. The information is automatically transferred and is available immediately from the brokers terminal. As an option a printout of the same nformation can be mailed to the broker or listing agent.

Figure 9:
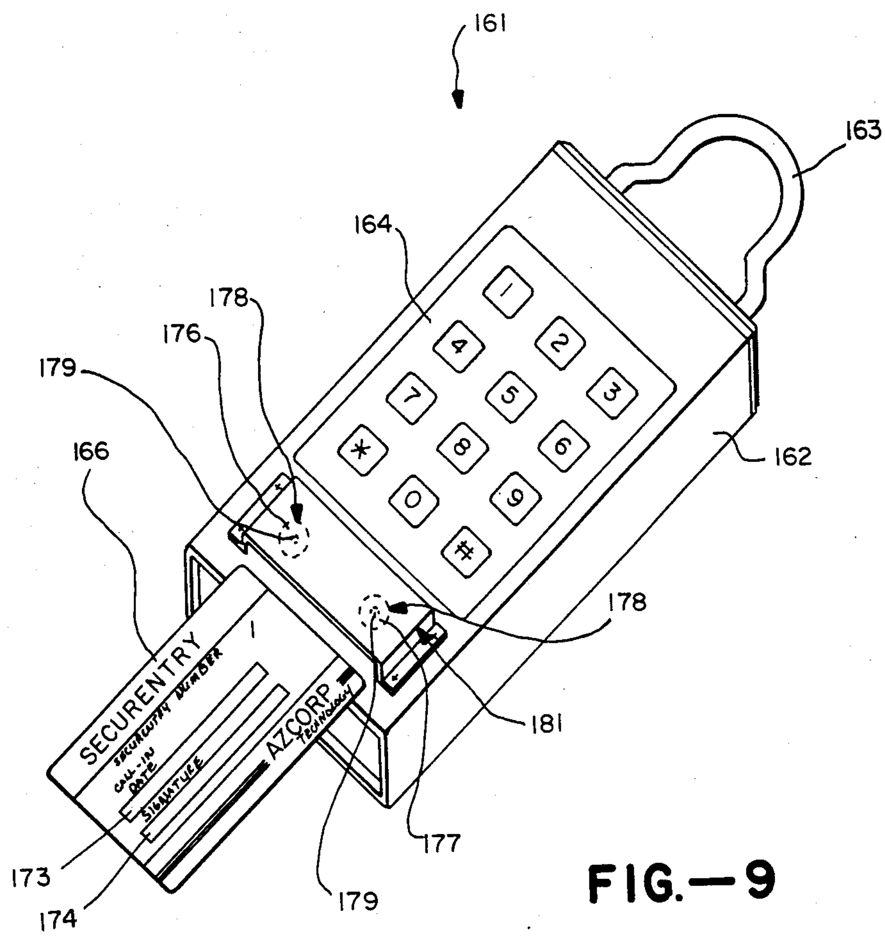
FIG. 9 is an isometric view of another embodiment of a lock box incorporating the present invention showing the use of, a card in conjunction with a key pad to obtain access to the lock box.

In FIG. 9 there is disclosed another embodiment of a lock box or key safe 161 incorporating the present invention. The lock box or key safe 161 is very similar to the lock box 11 hereinbefore described. It includes a case 162 of a similar construction with a removable shackle 163. It is also provided with a keyboard 164 of the type described in conjunction with the lock box 11.

Figure 10:
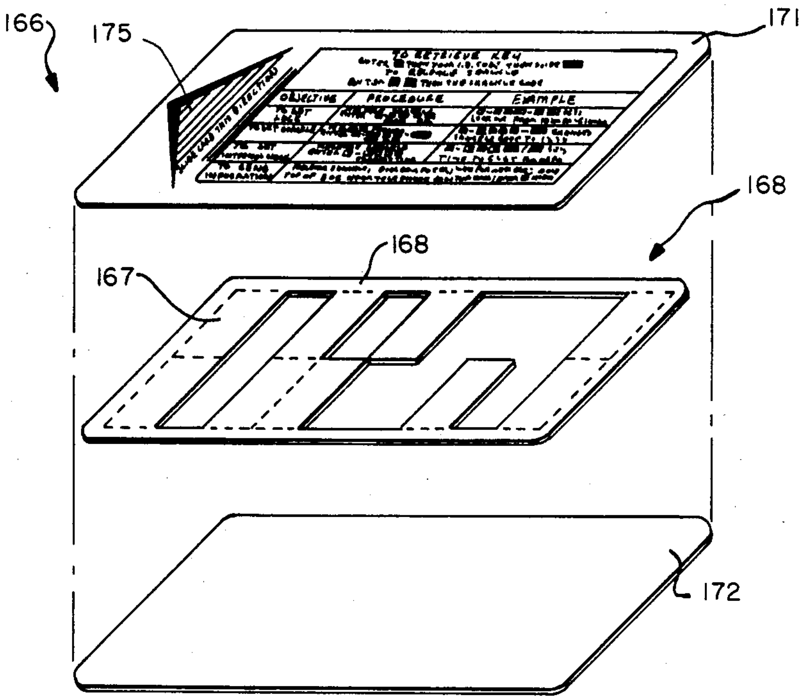
FIG. 10 is an exploded view of a card utilized in conjunction with the lock box shown in FIG. 9.

In the lock box 161 shown in FIG. 9, in addition to means for identification or an identifier provided through entering both the first and second codes into the key pad 164, there is provided a completely separate independent means of identification carrying the first code in the form of a physical device such as a card 166 shown in FIG. 9. An exploded view of the card 166 is shown in FIG. 10 and as shown therein, it can be seen that the card 166 consists of two spaced apart parallel rows of metallic elements 167 with a plurality of the metallic elements being disposed in each row. The number of metallic elements required in the card is determined by the number of unique cards required. For example with 9 elements in each of the two rows as shown in FIG. 10, there is a possibility of 65,000 combinations which can be set up from these two rows of 9 elements. If the two rows of ten bits each were used, this would provide 20 bits of information on a card. This would make it possible to have over a million users of the card without duplication. For example, this would permit the encoding of 1,000 different systems with each system having approximately 16,000 users.

As shown in FIG. 10, these metallic elements can be formed from a single sheet of a suitable metal as, for example, steel which is very ferrous and has a suitable thickness ranging from 0.005 to 0.020 of an inch and preferably approximately 0.010 of an inch. As can be seen, certain of the elements are punched out so there remains a rectangular rim 169 which carries the remaining elements 167 which form the unique code for that particular card. The rim 169 is provided merely as a convenience for holding the elements in the desired code prior to lamination of the same as hereinafter described. In entering the code into the sheet 169, it is only important that a change occur in at least one of the two rows in moving from one column to the next with the rows being considered as extending longitudinally of the card and the columns extending transversely of the card.

After the desired code has been placed in the sheet 168, the sheet 168 can then be laminated between two sheets 171 and 172 of a suitable opaque non-magnetic material such as plastic to form a card which is the size of a conventional credit card carried in a wallet. The sheets 171 and 172 are of asufficient thickness so that the metallic elements 167 are concealed between the same and are not visible to the human eye.

After the cards have been encoded, either manually or by a semi-automatic process, and the cards laminated as shown in FIG. 10, the cards cannot be changed or recoded in the field. This means that the card cannot be accidentally erased by passing the same through magnetic field. Also by constructing the card in this manner, it can be seen that the card cannot be readily damaged.

Printed information is carried by the front and rear sides of the card to aid the user in the use of the card. The front side of the card carries the following information.

SECURENTRY TM

- - -Securentry Number- - -

Call-In
date

Signature

/s/Keith S. Clark

AZCORP
TECHNOLOGY

As shown the front side carries a matted space 173 in which the call-in date and the five-digit user code number assigned to the real estate agent and four dashes representing the four-digit private code of the real estate agent can be printed by a dot matrix printer. This four-digit code should not be written down and preferably should be memorized. Another matted space 174 is provided in which the real estate agent places his signature. If desired, the front side of the card 166 can be modified to include a photograph of the real estate agent.

The rear side of the card as shown in FIG. 10 carries the following instructions arranged in three columns for retrieving a key from the lock box and for releasing the shackle as well as other functions.

TO RETRIEVE KEY
Enter * Then Your I.D. Code, Then Slide CARD
TO RELEASE SHACKLE
Enter * # Then The Shackle Code Then Slide CARD

| OBJECTIVE | PROCEDURE | EXAMPLE |
|---|---|---|
| To Set Lockout | Release Shackle<br>Enter 1 - pm am<br>begin end | 1-10 pm-6 am Sets Lockout From 10:00 p.m.-6:00 a.m. |
| To Set Shackle Code and Owner | Release Shackle<br>Enter 2 _ _ _ _ Card<br>new code | 2 - 1 2 3 4 - CARD Changes Shackle Code to 1234 |
| To Set | Release Shackle<br>Enter 3 _ _ _ _<br>correct time | 3-6 4 5 am pm Sets Time to 6:45 am or pm |
| To Send Information | Release Shackle, Dial Computer, Wait For Message, Hold Top Of Box Near Telephone Mouthpiece, Enter 4 on Box | |

With respect to setting any one of the functions which are possible from the instructions on the card, the lock box 161 knows that the owner or user of the lock box is attempting to set a function when the owner has opened the shackle 163 by using the shackle code. Once that information has been entered into the lock box and the lock box understands that it is the owner of the lock box who has access, the lock box will provide him with three additional minutes in which to perform a function. This function must be started by pressing either the 1, 2, 3 or 4 key within this three minute time interval. By pressing the 1 key, the owner sets the lockout feature into action which means that real estate agents will be locked out from 10:00 p.m. to 6:00 a.m. If this function is not set, real estate agents can obtain access to the key at all hours of the day and night.

If the 2 key is depressed, the shackle code can be changed. This may be desired if the lock box is sold to another real estate broker or if the real estate broker has a plurality of boxes and wishes all of them to have the same shackle code.

If the 3 key is pressed, the lock box user is given the opportunity to reset the time of the clock in the event the clock malfunctions and the time needs changing.

If the 4 key is pressed, the information recorded in the lock box is transmitted to the speaker 188. The user is given five seconds to hold the lock box 161 up to the telephone receiver so that the information given audibly by the speaker 188 of the lock box 161 is transmitted through the communication link, i.e., a telephone line, to a remote location as, for example, to the computer 132 at the central office.

In addition, there is provided on the back side an arrow 175 to indicte the direction in which the card 175 is to be moved when it is used with the lock box 161.

The information carried by the front and rear sides of the card 166 can be placed on the card in a suitable manner such as by silkscreening the information onto the card.

Figure 11:
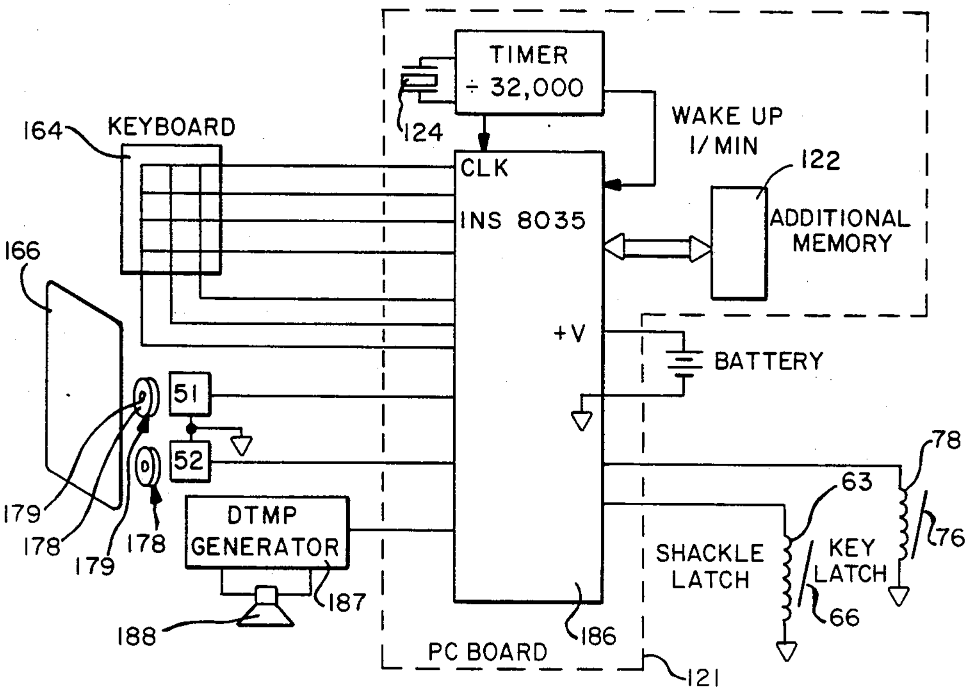
FIG. 11 is a block diagram of the electronic circuitry utilized in the embodiment of the invention using a lock box of the type shown in FIG. 9.

The two rows of metallic elements 167 carried by the card 166 are adapted to be read by sensors identified as Sl and S2 in the block diagram in FIG. 11. The sensors Sl and S2 are of a type which can sense a change in a magnetic field and are identified as Hall effect integrated circuits. These sensors Sl and S2 are mounted within the case 162 in a manner hereinafter described and are positioned adjacent to the lower extremity of the front wall of the case 162. Since the case 162 is formed of steel, means is provided in the case to provide a clear field of view for a magnetic field disturbance outside of the case. This is provided by providing two holes 176 and 177 which are spaced far enough apart so that each of the holes is in registration with one of the rows of metallic elements 167 carried by the card 166. The holes 176 and 177 are plugged with a non-magnetic material. One material found to be satisfactory is aluminum. A relatively strong but small magnet 179 is mounted in each of the plugs 178. The sensors Sl and S2 are positioned with respect to the magnets 179 so that they can sense the magnetic field which is created by the magnets.

A U-shaped bracket 181 is secured to the front wall of the case 162 by suitable means such as spot welding and serves as a means to guide the card 166 over the front of the case 162. The case is guided in such a manner so that the two rows of metallic elements 167 carried by the card 166 can be sensed by the sensors Sl and S2 as the magnetic fields created by the magnets 179 are disturbed by the elements or lack of elements in the two rows of elements carried by the card 166 as relative movement occurs between the card and the lock box 161. Typically this relative movement occurs by passing the card 166 upwardly through the U-shaped bracket I8I until it extends all the way through the bracket. The plugs 178 carrying the magnets 179 are concealed from view below the bracket 181. In addition, the case is finished in such a manner so that the plugs 178 and the magnets 179 carried thereby preferably would be invisible to the human eye even if the bracket 181 were not present.

It should be appreciated that the magnetic sensing means for sensing the elements in the card 166 can be positioned in any desired location on the case 162. For example, it can be positioned on the rear of the lock box 161. It has been positioned on the front of the box 161 as shown in FIG. 9 for the reason that typically the lock box will be hung on a door knob and the real estate agent utilizing the same could lift the lock box forward with one hand and slide the card 166 through the same and also operate the keyboard 164.

In FIG. 11, there is shown a block diagram of the electronic circuitry used in conjunction with the lock box 161 and the card 166. As can be seen from FIG. 11, the card 166 is positioned in a location which is on the side opposite the magnets 179 that the sensors S1 and S2 are mounted. The Hall effect sensors S1 and S2 are of a conventional type. Without a card being present, the magnets 179 are biasing these sensors S1 and S2 to a predetermined voltage. When the metallic elements carried by the card 166 pass through the magnetic field created by the magnets 179, this disturbance in the magnetic fields is sensed by the sensors S1 and S2 with the sensor S1 sensing the changes in one row and the sensor S2 sensing the changes in the other row. Use of the Hall effect sensors S1 and S in conjunction with the metallic elements 167 in the card 166 make possible a very reliable and inexpensive card and sensor assembly.

The printed circuit board 121 is provided within the case 162 and carries an INS 8035 board 186 of a conventional type such as one supplied by Intel. This board 186 is connected to the same circuitry as the lock box 11 hereinbefore described. However, in addition there is provided a DTMF generator 187 of a suitable type such as a Mitel 5089 which is connected to a speaker 188. The DTMF generator 187 has been utilized because it provides enhanced tone generation capabilities. As is well known to those skilled in the art, it takes a binary code from the microprocessor 186 and synthesizes in an analog fashion two sine waves of different frequencies and then sums the same for transmission channels for decoding at the other end of the system.

In using a card 166 in conjunction with a lock box 161 as shown in FIG. 9, a typical real estate would enter the offices of the real estate board or multiple listing board and have his name entered into the central computer and have a card issued to him which would have encoded in the metallic elements therein the first code which would be the code assigned to that real estate agent by that board. This first code typically would be a five-digit code. Typically this would occur once in a lifetime of that real estate agent with that real estate board. The real estate agent would then go to a touch tone telephone and call the real estate board computer 132. The computer automatically answers the telephone and after the real estate agent has identified himself by punching in a private four-digit code selected by him on the keyboard of the telephone, the computer 132 will then in an audible voice speak to the real estate agent and give him a spoken code which should be the same he gave the computer. This private four-digit code is either remembered by the real estate agent or written down in a secure location. This four-digit code serves as the second code for the system and is utilized by that real estate agent for entering lock boxes which are in the system.

Let it be assumed that a real estate agent desires to show a home which has a lock box of a system installed on the doorknob of the home. When the real estate agent arrives at that home, he will grasp the lock box in one hand and slide the card 166 through the bracket 181 to enter the first code which is a five-digit code. Thereafter he will enter the second code which is his private four-digit code into the lock box 161 by depressing the appropriatc keys of the key pad 164. If this has been accomplished properly a tone will a tone will be sounded by the lock box 161. The real estate agent is then given three seconds to press upwardly on the bottom of the key compartment 20 to cause it to be released and moved outwardly to the position shown in FIG. 1 so that the real estate agent can have access to the house key. When the visit has been completed, the house key can be replaced in the key compartment 20 and the key compartment moved to a locking position in the lock box. It should be appreciated if the real estate agent owned that particular lock box 61 he also would be able to punch in a code previously selected by him to enable him to remove the lock box from the door knob by releasing the shackle 36.

Thus it can be seen with this embodiment that in order to obtain access to the key, it is necessary for the real estate agent to insert two separate and independent identifiers, one in the form of a code punched in through the key pad 164 and the other in with the code inserted by introducing the card 166 into a position in proximity to the lock box but exterior of the lock box 161 and moved through the magnetic fields created by the magnets 179. As soon as this information has been inserted, the real estate agent can obtain access to the key in the lock box as herebefore described. The lock box as also previously indicated will record the identity of who has obtained access to the key, how long the key compartment 20 is open as well as the date and time at which this occurred. This information which is stored in an additional memory can be called up by the owner of the lock box when he desires to transfer the information from the additional memory out through the DTMF generator 187 to the speaker 188 by holding the lock box up to the telephone and transferring the information in the additional memory to the central computer where it is stored and made available for use by that real estate agent and the real estate board.

As set forth above, the card itself on its back side gives instructions on how to retrieve the key and also how to release the shackle. It also gives the card user instructions on which direction to slide the card. The system used is not a contact system and therefore there is no requirement for cleaning and maintenance. The system is time independent. By this it is meant that the card can be moved as slow as desired or as fast as desired past the sensors. Thus by way of example the card 166 can be moved a fraction of an inch per second or up to 10 inches per second and still the entire card can be read. All that is necessary with the sensing system is to sense the presence or absence of the metallic elements or code strips. With the system of the present invention it is unnecessary to have any mechanical means for moving the card. The user can move the card at any rate of speed desired.

Figure 12:
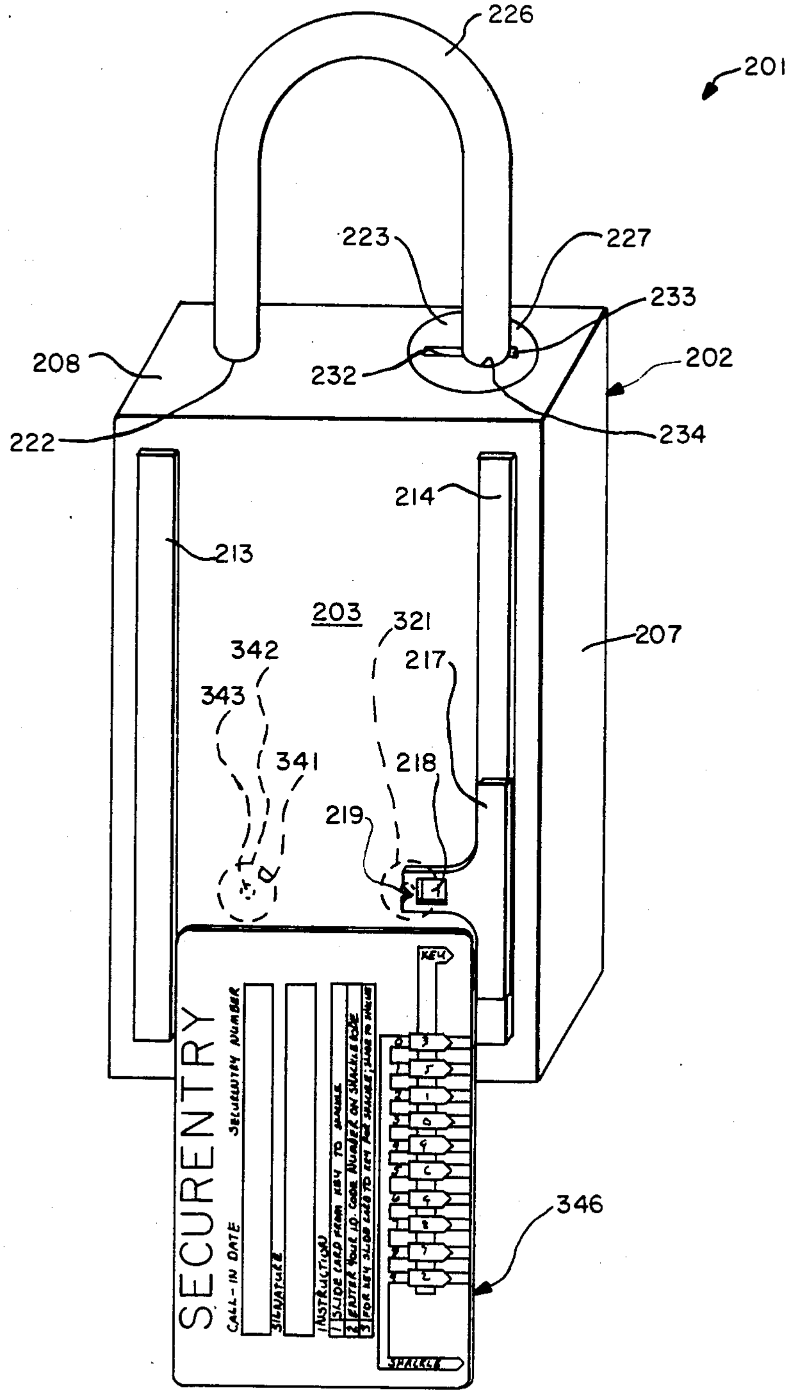
FIG. 12 is an isometric view of another embodiment of a lock box incorporating the present invention showing the same being utilized with a card carrying two types of identification needed to obtain access to the lock box.
Figure 13:
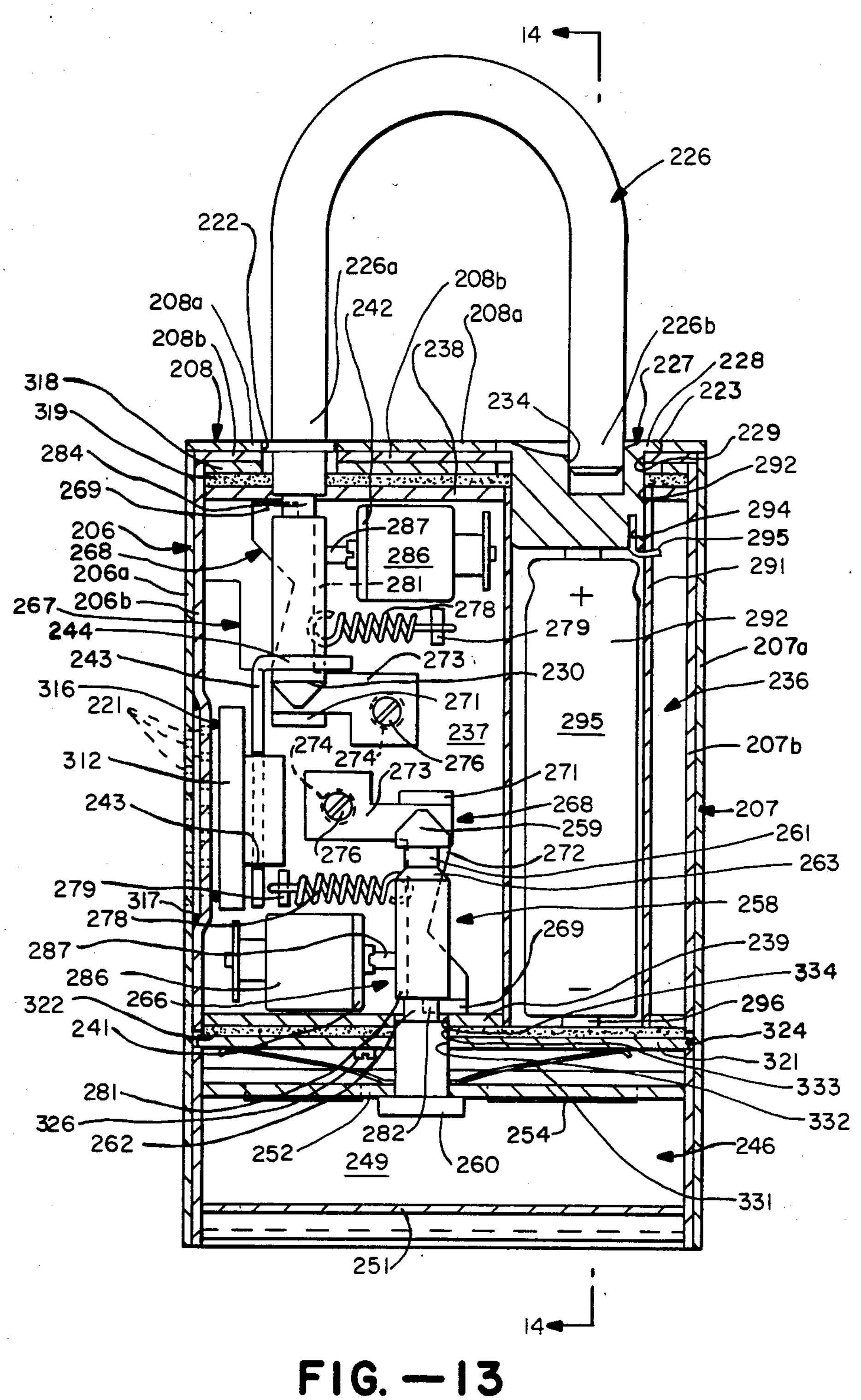
FIG. 13 is a cross sectional view of the lock box shown in FIG. 12.
Figure 14:
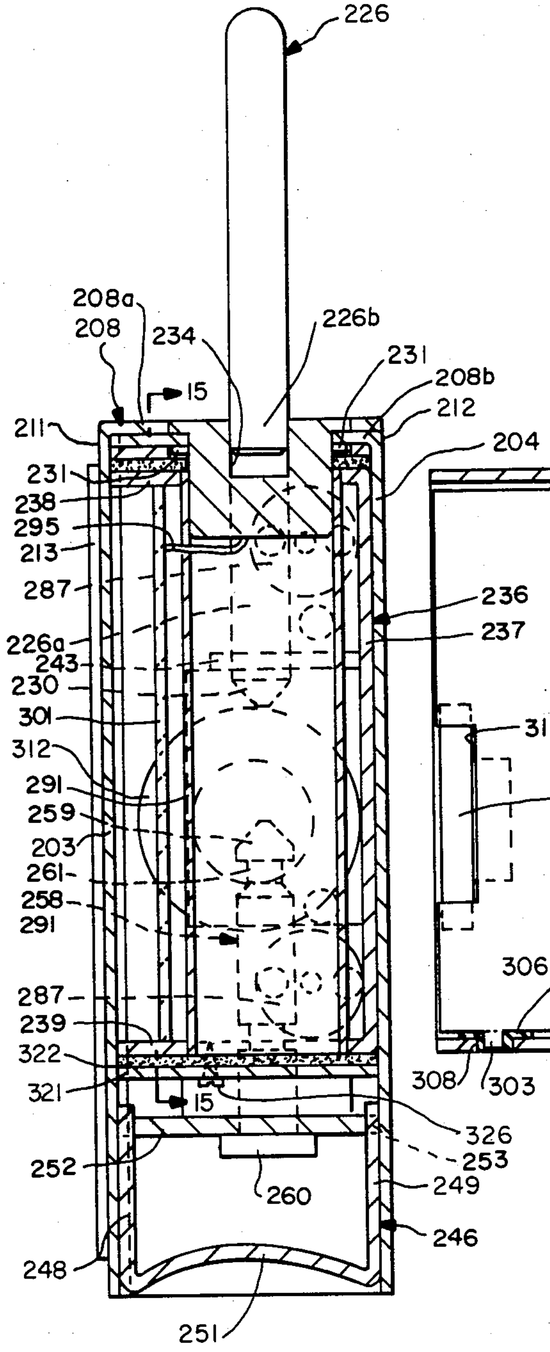
FIG. 14 is a cross sectional view taken along the line 14—14 of FIG. 13.

Still another embodiment of a lock box is shown in FIGS. 12 through 14. As shown therein, a lock box 201 consists of a housing or case 202 which is in the form of a five-sided rectangular enclosure having front and rear walls 203 and 204, side walls 206 and 207 and a top wall 208 with a bottom open side. The housing or case 202 is formed by utilizing two U-shaped channels 211 and 212. The U-shaped channels 211 and 212 are formed so that they can fit into each other to provide the rectangular housing or case 212. The top ends of the U-shaped channels 211 and 212 are bent so that the front U-shaped channel 211 has its upper extremity bent rearwardly and the rear-shaped channel 212 has its upper extremity bent forwardly to form the top wall 208 with two layers **208*a* and 208*b* of metal. Also it can be seen that the U-shaped channel 211 and 212 form overlapping side portions that provide the side walls 206 and 207, each with two layers of metal 206*a* and 206*b* and 207*a* and 207*b*. In this way it can be seen that the housing or case 212 can be made relatively inexpensively by welding together the U-shaped channels 211 and 212 after they have been frrmed. A pair of spaced apart runners or guides 213 and 214 are secured to the front side 203 of the case. They can be secured by suitable means such as spot welding. If desired, the runners can be formed integral with the front wall by stamping the front wall to provide such raised runners or guides. The runners 213 and 214 are positioned so that they can guide a card as it is moved across the front of the lock box 202. A tee-shaped bracket 217 is provided and is secured to the lower extremity of the runner 214 by suitable means such as welding. The bracket 217 is provided with a rectangular eyelet 218 for a purpose hereinafter described. It is also provided with a notch which is generally in registration with the eyelet 218** for a purpose hereinafter described.

The side wall 206 of the case is provided with a plurality of holes 221 which generally cover a circular area of the layers **206*a* and 206*b* of the side wall 206 generally approximately equidistant from the ends of the side wall 206. The top wall 208 of the case 202 is provided with small holes 222 extending through both layers 208*a* and 208*b* of the top wall 208 and another larger hole 223 which extends through the layer 208*a* and a smaller hole 224 having the same center as hole 223 and that extends through the layer 208*b***.

A U-shaped shackle 226 has one end **226*a* disposed in the hole 222 and has another end 226*b* extending into a cap 227. The portion 226*a* is provided with a conical tip 230. The cap 227 is provided with a shoulder 228. The shoulder 228 is seated in the hole 223. The hole 223 only extends through the uppermost layer 208*a* forming the top wall 208. The remainder of the cap 227 extends downwardly into the case 202 as shown. The cap 227 is provided with two diametrically extending pins 231 which are adapted to pass through diametrically opposed slots (not shown) provided in the layer 208*b*. When the pins 231 drop through these slots, the cap 227 can be rotated or twisted to lock the cap in place with the pins 231 engaging the underside layer 208*b* of the top wall 208. The cap 227 is provided with a slot 233 extending diametrically of the same which can be engaged by a coin or similar object to rotate the cap 227 to position it in the case 202. The cap is provided with a hole 234 which extends through the slot 233 but which is mounted off center of the cap 227. The hole 234 is adapted to receive one end 226*b* of the shackle 226. When the shackle 226 is in place, the cap 227** cannot be rotated.

A U-shaped chassis 236 is provided. The chassis can be formed of a suitable material such as steel. As shown, the chassis is provided with a rear wall 237 and two upturned end walls 238 and 239. The chassis 236 is also provided with two upturned ears 241 and 242 which, if desired, can be punched out of the chassis and bent upwardly at a 90° angle with respect to the rear wall 237. The chassis 236 is also provided with an L-shaped bracket 243 which extends upwardly from one side of the chassis 236 and adjoins the rear wall 237. One portion of the L-shaped bracket 243 is provided with a hole 244 through which one leg **236*a* of the shackle 226 extends. Thus it can be seen that the bracket serves as a secondary support guide for the shackle 226** to keep twisting of the shackle to a minimum.

A key container 246 also comprises a part of the lock box 201. The key container 246 is formed of a U-shaped member 247 which is provided with upwardly extending side walls 248 and 249 which are spaced apart and parallel and a bottom wall 251. The bottom wall 251 is curved and as looking at the U-shaped member in cross section has a concave surface facing downwardly from the lock box 201 when it is disposed within the lock box. The upper end of the key container 246 is closed by a plate 252 which is provided with outwardly extending elongate ears 253 which seat in elongate recesses 254 provided in the upper extremities of the side walls 248 and 249. The key container 246 can be formed of a suitable material such as nickle plated steel.

Thus it can be seen that there has been provided a key container 246 which is provided with side walls, a bottom wall and a top wall with both ends being open. Also it can be seen that the key container 246 provides a compartment 256 which is large enough to hold a key or a number of keys of a conventional size. By providing a key container 246 with end openings, a key container has been provided which has great strength. It will be very difficult to pry open the lock box to obtain access to tke key container when the key container is disposed within the lock box. This is particularly true because of the bowed or curved construction of the bottom wall of the key container which increases the strength of the key container.

Means is provided for removably latching the key container within the lock box and consists of a centrally disposed post 258 which is mounted in the plate 252 by suitable means such as a press fit. The post 258 is provided with a oonical tip 259 and a head 260. It is also provided with an annular recess 261 immediately below the conical tip 259 and an additional annular recess 262 adjacent the plate 252.

First and second solenoid operated latching mechanisms 266 and 267 are provided and are mounted on the chassis 236. The first latching mechanism 266 is utilized for engaging the post 258 whereas the second latching mechansim 267 is adapted to engage the retainer in the form of a shackle 226. Both of the latching mechanisms 266 and 267 are substantially identical. Each consists of a U-shaped member 268 which is provided with upturned legs 269 and 271 that extend at right angles to an intermediate portion 272. The U-shaped member 268 is provided with another leg 273 which lies in the same plane as the portion 272 and extends outwardly at right angles thereto and to which the legs 269 and 271 are perpendicular. The leg 273 is pivotally mounted on the rear wall 237 of the chassis 236 by suitable means such as by use of a threaded boss 274 mounted in the side 237 in a suitable manner such as a press fit and by a screw 276 retaining the leg 273 on the boss.

Yieldable means is provided for causing pivotal movement of the U-shaped member 268 about the pivot formed by the boss 274 and at a direction so that the leg 271 is urged towards the side wall 206. This yieldable means takes the form of a spring 278 which has one end secured to an ear 279 extending upwardly from the rear wall 237 and having the other end engaging an upstanding ear 281 provided on the portion 272 of the U-shaped member 268. The leg 271 is provided with an arcuate notch 282 which facilitates seating of the leg 269 in the recess it is supposed to engage. In the first latching mechanism 266, it is to engage the annular recess 262 provided on the post 258. In the second latching mechanism 267 it is adapted to seat in the annular recess 284 provided on the shackle 226.

Each of the latching mechanisms 266 and 267 includes a solenoid 286 of a conventional type which is mounted on the rear wall 237 adjacent to the ear 281 so that its plunger 287 is adapted to engage the ear 281 to retain the leg 269 out of engagement with the associated recess so that the member latched thereby, either the post 258 or the shackle 226 can be removed.

A cylindrical battery case or tube 291 formed of a suitable material such as polyvinyl chloride is carried by the chassis 236 on one side thereof and extends through holes 292 and 293 provided in the end walls 238 and 239. A battery 295 providing a suitable voltage such as 9 volts is provided in the battery tube 291 and has its negative terminal resting against a spring urged contact 296. Contact is made with the positive terminal of the battery 295 by the cap 227 which is disposed in the upper extremity of the battery tube 291. It is apparent that the battery 292 can be inserted through the top wall 208 when the cap 227 is removed in the manner hereinbefore described. Contact is made to the cap 227 by providing a hole 294 in the cap into which a connecting wire 295 is silver soldered.

A printed circuit board 301 is mounted in the chassis 236 in such a manner so that it lies in a plane which is generally parallel to the rear wall 237. The printed circuit board 301 is provided with a centrally positioned ear 302 on its upper extremity and two spaced apart ears 323 and 324 on its lower extremity. Ears 302, 303 and 304 carry rubber grommets 306 which serve to shock mount the printed circuit board 301 in the end walls 238 and 239 of the chassis 236. The ear 303 extends into a slot 307 provided in the end 238 and the ears 303 and 304 extend into holes 308 and 309 provided in the end wall 239.

Figure 15:
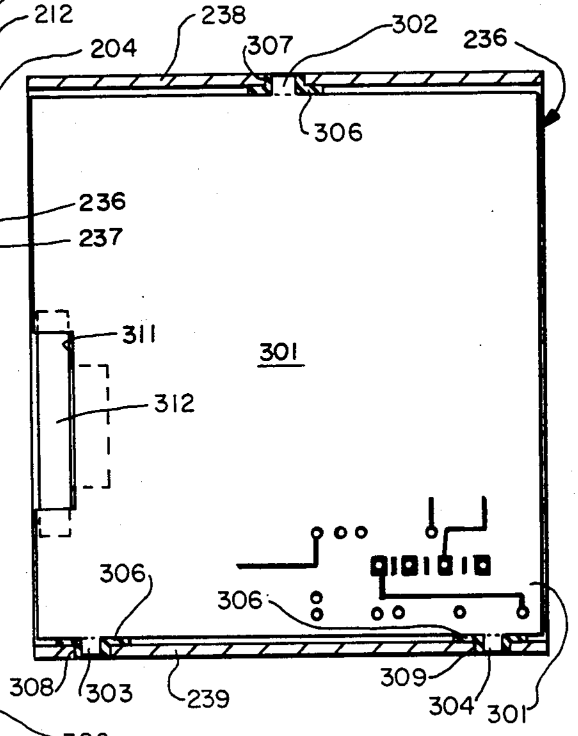
FIG. 15 is a cross sectional view taken along the line 15—15 of FIG. 14 and particularly shows the mounting of the printed circuit board.

The PC board 301 is provided with a cutout 311 which is adapted to accommodate a speaker 312 of a conventional type. The speaker 312 is mounted in an arcuate slot 313 provided in the upstanding L-shaped bracket 243. It can be seen that when the chassis 236 is mounted in the case 202 in the manner shown in FIGS. 13–15 that the speaker 312 is opposite the holes 221 provided in the side wall 206. Speaker 312 is of a type which is impermeable to water and is provided with an impervious plastic outer covering. An O-ring 316 is provided for forming a seal between the case 202 and the speaker 312 so that moisture or water cannot enter into the case through the holes 221. An additional O-ring 317 is provided between the layers **206*a* and 206*b* of the side wall 206** to prevent entry of moisture or water between the layers.

The lock box 201 is provided with a spacer plate 318 which has a layer 319 of sponge rubber secured thereto by suitable means such as an adhesive. The spacer 318 is formed of a suitable material such as steel. It is inserted through the bottom opening of the case 202 with the sponge rubber facing downwardly until it engages the layer **208*a* of the top wall 208 of the case. Thereafter, the chassis 236 carrying the parts hereinbefore described mounted thereon is pushed thrugh the bottom opening until the upper end wall 237 engages the sponge rubber layer 299. The sponge rubber layer 299 serves to provide a water-tight enclosure for the upper portion of the lock box 201**.

As soon as the chassis 236 is in position in the case 202, it is removably retained therein by a plate 321. The plate 321 is also provided with a layer 322 of a sponge rubber material. The plate 321 is adapted to be seated in slots 324 provided in the side wall layers **206*b* and 207*b*. As can be seen the slots 324 extend transversely of the side walls but only extend through the layers 206*b* and 207*b* of the side walls 206 and 207 and not through layers 206*a* and 207*a* so that the slots 324** are invisible from the exterior of the case.

The plate 321 is mounted in the slots 324 by moving it in an inclined manner through the bottom opening in the case 202 and then positioning one end of the plate 321 in one of the slots 324 and then moving the other end of the plate 321 into a position in line with the other slot 324. The plate 321 is then shifted sidewise of the case to move the other end of the plate 321 into the other slot 324 so that the plate 321 extends approximately halfway into each of the slots 324. The plate 321 is then fastened in this position by a screw 326 which extends into the end 239 of the chassis. This retains the chassis 236 in the case 202.

After the chassis 236 has been mounted in the case 202, the battery 292 can be mounted in the tube 291 and the plug 294 inserted. Thereafter, the cap 227 can be mounted in the top wall. The shackle 226 then can be mounted in the top wall 208 so that it extends into the hole 234 provided in the cap 227 and so that it extends through the hole 222 provided in the top wall 208 and extends into the hole 244 provided in the bracket 243. As this is occurring, the conical tip 230 of the shackle 226 will move the leg 269 out of the way against the force of the spring 278 so that it can enter the hole 244 provided in the bracket 243. When the shackle 226 is in its home position the leg 269 will engage the annular recess 284 to latch the shackle 226 so it cannot be removed until the latching assembly 267 is made operative.

Thereafter, the assembly of the lock box 201 is completed by placing an arcuate spring member 331 on the post 258 and then inserting the key container 246 through the bottom opening of the case 202 so that the post 258 extends through holes 332 and 333 provided in the plate 321 and the layer of sponge rubber 322 and through a hole 334 provided in the wall end 239. As the conical tip 259 of the post 258 clears the hole 334, it engages the leg 269 and cams it out of the way against the force of the spring 278. This movement continues until the recess 262 provided on the post 258 clears the hole 334 and is engaged by the leg 269 seating in the recess 262. This completes the assembly of the lock box. It can be seen that the foam rubber layers 319 and 322 which are provided form water-tight seals for the upper and lower extremities of the lock box to protect the electronics carried by the chassis 236.

In order to provide a field of view for a magnetic disturbance occurring outside of the case 202, the front wall 203 of the case is provided with a pair of spaced apart holes 341 in which there are disposed plugs 342 of a suitable non-magnetic material such as aluminum. Each of the plugs 322 carries a small relatively powerful magnet 343. One of the magnets 343 is in very close proximity and generally underlies the aperture 218 and the notch 219 provided in the tee-shaped member 217 mounted on the front wall 203. By mounting the magnets 343 within the plug 342 and mounting the plugs in the holes 321, flush surfaces can be provided on the front and back sides of the case 202. Thereafter, the entire exterior of the case 202 can be finished in an appropriate manner. By way of example a hard plastic surface can be coated onto the steel so as to make it very weather resistant and impervious to scratches and the like.

Figure 16:
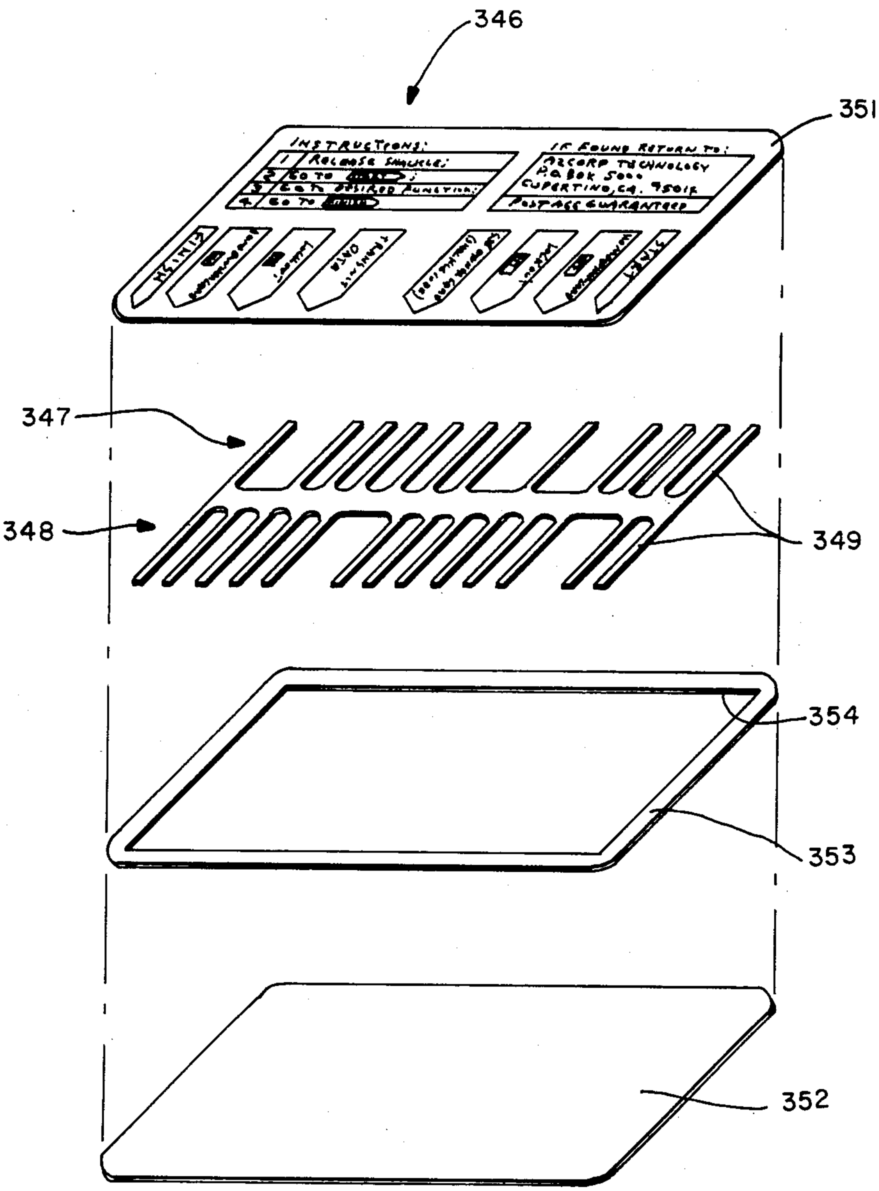
FIG. 16 is an exploded view of a card of the type shown in FIG. 12.

Means exterior of the case 202 in the form of a rectangular card 346 is provided for disturbing the magnetic fields created by the magnets 343. The rectangular card 346 is constructed in the manner shown in FIG. 16 in which there is shown an exploded view. The card consists of first and second spaced parallel columns 347 and 348 of metallic elements 349 which are disposed in parallel alignment rows. The metallic elements 349 are constructed from a sheet of suitable magnetic material such as a highly ferrous steel having a thickness ranging from 0.005 to 0.020 inches and perferably a thickness of approximately 0.010 inches. The elements 349 have a a width of approximately 0.040 inches. With the arrangment shown, a maximum of 15 elements can be provided in each of the two columns 347 and 348. A first five-digit code is placed in the elements 349 by removing certain of the elements as shown in FIG. 16. After a code has been placed in the elements 349 in a suitable manner such as by manual removal or by semiautomatic removal of certain of the elements, the elements in their predetermined arrangement are laminated between two sheets 351 and 352 of a suitable non-magnetic opaque material such as plastic. In order to provide appropriate spacing between the outer margins of the sheets 351 and 352 a rectangular frame 353 of a suitable material such as cardboard is provided between the sheets 351 and 352 and has an interior opening 354 which is sized to accommodate the metallic elements 349.

It can be seen that the metallic elements 349 are buried between two plastic sheets 351 and 352 just as in the previous card 166 so that they are concealed from view. The spacing arrangment of the elements 349 is such that 15 possible elements can be provided in each of the rows 347 and 348 making possible $3^{15}$ possible endcoding to the base 3 and code combinations. As shown particularly in FIG. 16, the spacing arrangement is such that only one element in each row of the two columns is removed. In other words, the arrangement of metallic elements is such that one element is always present in each row of the two columns.

Figure 17:
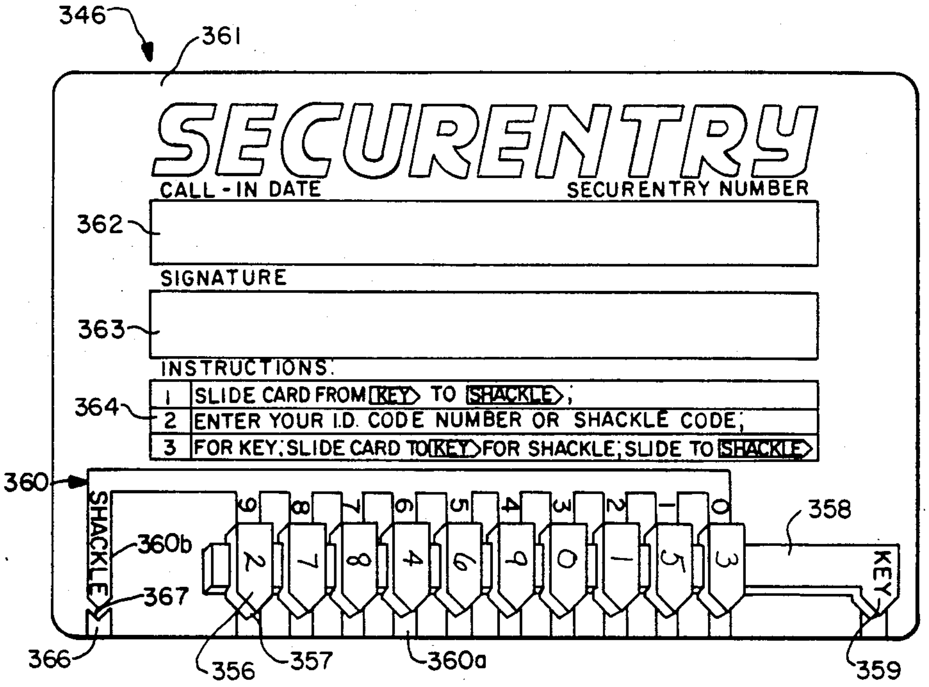
FIG. 17 shows the front side of the card shown in FIG. 16.
Figure 18:
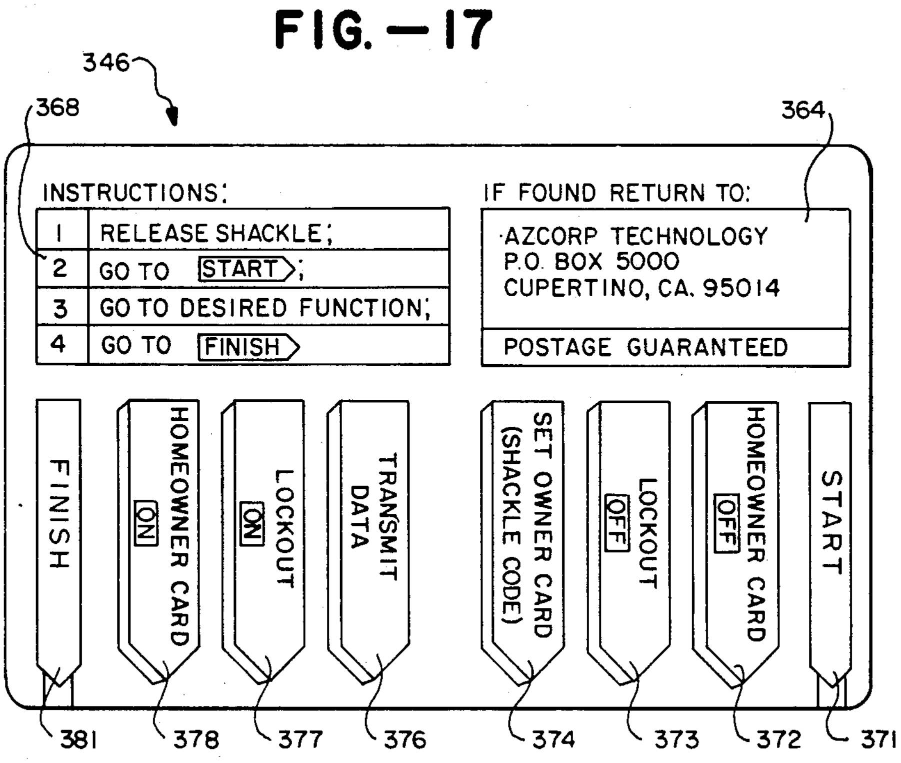
FIG. 18 shows the rear side of the card shown in FIG. 16.

The front and back exterior surfaces of the card 326 are shown in FIGS. 17 and 18. Both sides of the card 326 have information silkscreened on them as can be seen from the drawings. The front side of the card as shown in FIG. 17 is provided with a plurality of spaced apart rectangular blank spaces 356 which have their corresponding sides parallel to that of the card with the exception of the side adjacent the lower extremity of the card as viewed in FIG. 17 which is provided with a triangular point 357. These blank spaces 356 are formed of a material which will phosphoresce. A typical material for this purpose is a conventional phosphorescent paint which is covered with a thin transparent protective matte layer (not shown). The protective layer must be one which can be written upon and the writing thereafter erased as hereinafter described. In natural light, the spaces 356 can have any suitable color, as for example, blue. The spaces 356 are arranged in a row and overlie a bar 358 of a suitable color such as red. The bar 358 extends almost the entire length of the card 346 and is provided with an arrow 359 at the upper extremity of the same which faces the lower side of the card as viewed in FIG. 17. The legend "Key" appears on the arrow 359. A grid 360 of a suitable different color such as grey is imprinted on the front surface of the card 346 and has leg portions **360*a* which are in alignment with the spaces 356. These leg portions 360*a* carry fixed indicia of a suitable type such as arabic numerals 0–9 as shown. The grid is also provided with an arrow portion 360*b*** which carries the legend "shackle".

The front surface of the card 346 also provides a rectangular space 361 which can be utilized for carrying the trademark or trade name of the company producing or utilizing the card. Immediately below the rectangular space 361 there is provided another rectangular space 362 which has the legends "call-in date" and "security number" above the same. As with the previous card 166, the call-in date and the first code, a five-digit code, assigned to the real estate agent can be printed in the space at the time of issuance of the card to the agent. In addition there is provided another rectangular space 363 which is used for the signature of the cardholder. Below that space 363, there appears another rectangular space 364 which carries instructions 1, 2 and 3 as enumerated thereon for use by the holder of the card. The meaning of these instructions will hereinafter be explained. The card also carries a marker 366 which has a V-shaped recess 367 for use in removing the schackle as hereinafter described.

The other or rear side of the card 346 as shown in FIG. 18 also carries certain indicia and instructions. It has a rectangular space 368 that carries a plurality of instructions which are utilized in a manner hereinafter described. It also has a space 369 in which there can be imprinted the name of the individual organization to which the card should be returned in case it is found after it has been lost or misplaced. The card also carries a plurality of additional indicia in the form of arrows including a "start" indicia 371, a "homeowner card", "off" indicia 372, a "lockout" indicia 373, a set owner card (shackle code) indicia 374, a "transmit data" indicia 376, a "lockout" "on" indicia 377, a "homeowner card" "on" indicia 379 and a "finish" indicia 381. It will be noted that all of these indicia 371 through 381 are spaced apart and are arranged along one side margin of the card and face in a direction which is adjacent the lower side of the card as viewed in FIG. 18.

Figure 19:
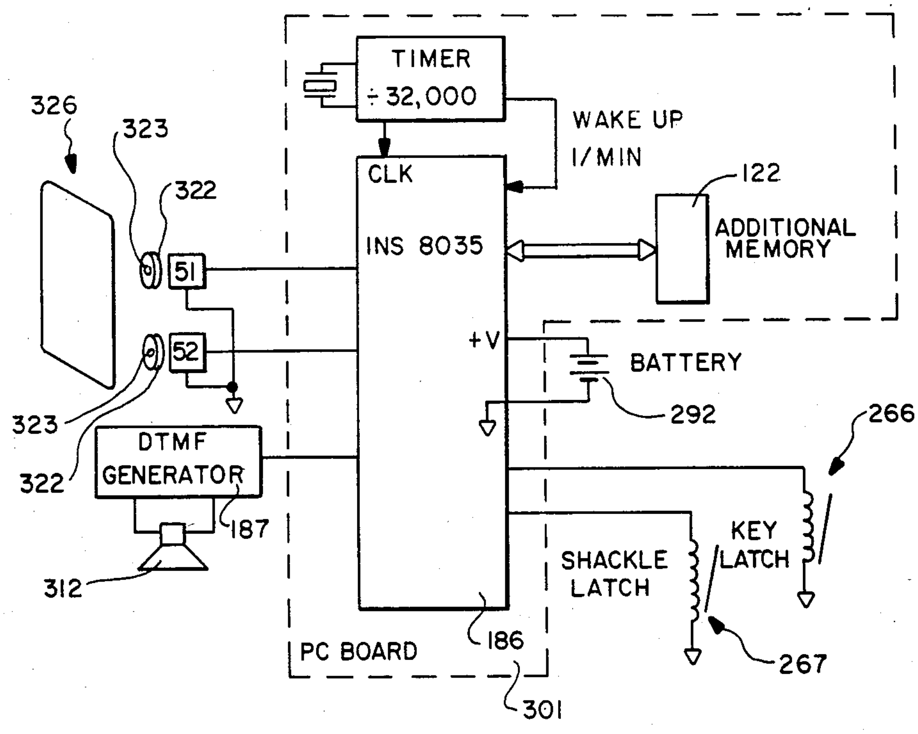
FIG. 19 is a block diagram of the electronic circuitry utilized in conjunction with the lock box shown in FIG. 12.

The electronic circuitry shown in FIG. 19 and which is utilized in conjunction with the lock box 201 is very similar to that shown in FIG. 11 with the principal exception that the key pad 164 and the associated circuitry have been omitted.

Operation and use of the lock box 201 shown in FIGS. 12–15 in conjunction with the card 346 may now be briefly described as follows. Let is be assumed that a real estate agent desires to obtain a card to utilize in conjunction with the system. The real estate agent will be issued a card and the call-in date and a five-digit code will be printed in the space 362 just as in conjunction with the card 166 previously described. The five-digit code is the first code and is the code carried by the metallic elements 349. The real estate board assigns this first code to that agent. The agent at that time can sign the aard with his signature in the space 363.

After being issued the card 346, the real estate agent can call the computer 132 in the system at any time to obtain a second code. The real estate agent identifies himself by first entering the five-digit number which he has been assigned and also by supplying his own private four-digit code by use of the touch tone telephone. The computer, if it then identifies the agent as being one which is on the system, will speak a ten-digit code to the agent with each digit being a number between 0 and 9. These ten digits given to the real estate agent are written by the real estate agent in sequence on the blank spaces 336 on the card in a suitable manner such as by pencil or ink but in such a manner so that they can be erased when the ten-digit code is changed as hereinafter explained. The ten-digit code supplied to the real estate agent has his private four-digit code scrambled into it.

As soon as the ten-digit code which has been supplied by the computer 132 has been entered on the card 346, the card 346 is ready for use by the real estate agent. Let it now be assumed that the agent desires to enter a house on which a lock box 201 has been provided. The agent grasps the lock box 201 in one hand and then inserts the card 346 in the other hand between the spaced runners or guides 213 and 214 adjacent to the front wall 203 and follows instruction 1 of the instructions 364 so that the key arrow 359 first will enter the aperture or window 218. The card 346 is then moved along the lock box 201 until the shackle indicator or mark 366 with its vee-shaped indentation 367 passes under the aperture 218. This causes the first code, the five-digit code carried by the metallic elements 349 to be entered into the microprocessor 186.

Instruction 2 of instructions 364 is then followed to enter the agent's private four-digit code which is the second code. The agent either by memory or by reference to a source independent of the card 346 recalls that his private code is, by way of example, 9 5 4 6 and then stops the card at the point where the number 9 which he had written in the spaces 336 underlies the aperture 218. In a similar manner he thereafter stops the card at position 5, then at position 4 and lastly at position 6. As can be seen this is accomplished in the same manner in which a combination lock is opened. The card 346 is then advanced to tke key indicium 359 in accordance with instruction 3 of instructions 364. As the card 326 is being advanced back and forth between the numbers, the elements 349 in both rows 327 and 328 are activating the sensors Sl and S2 which supply the information for the second code into the microprocessor 186. Since each of the two columns 347 and 348 of metallic elements 349 has only one change per position of the fifteen possible positions, the microprocessor 186 will sense these changes to record the private code being entered. Each position has two bits of information, either "0's" or "1's", with one bit in each row. If a metallic element 349 is present in a position in a row it is a "1" and if the metallic elemen 349 is absent it is a "0".

After the first and second codes have been recognized by the microprocessor 186 as being proper, the lock box 201 will send an audible tone over the speaker 312. This will give the real estate agent a limited amount of time as, for example, three seconds in which to gain access to the key container 246 in the lock box 201. This is accomplished by the real estate agent pressing upwardly on the bottom wall 251 of the key container 246 to move the post 258 upwardly so that the conical tip 259 will be moved into engagement with the leg 271 of the U-shaped member 268 causing it to be cammed upwardly against the force of the spring 278 and to move the leg 269 out of engagement with the recess 262. At the same time that this is occurring, the solenoid 286 is energized to cause its plunger 287 to move into engagement with the ear 281 to aid movement of the leg 269 out of engagement with the recess 262. As soon as the key container 246 has been moved upwardly to cause release of the post 258, the key container 246 can be released and it will be pushed outwardly through the bottom opening of the case 201 by the spring 331. This can occur because the solenoid 286 remains energized and retains the U-shaped member in a position out of engagement with the post 258 and permits the recess 262 to readily clear the leg 269 and thereafter permit the recess 261 to clear the leg 269. During this time and after the predetermined interval of three seconds, the solenoid 286 will become deenergized permitting the spring 278 to bring the U-shaped member 268 back into a position where it can engage the recess 261 on the post 258 to thereby prevent the key container 246 from falling completely out of the case 202. When the key container 246 is held in this position, the end openings of the key container 246 have cleared the case 202 and are readily accessible. The lock box 201 then can be tipped sideways to permit the key carrier therein to slip into the real estate agent's hands. When the agent has shown the house, the key can be replaced in the key container 246 and then the key container can be shoved upwardly into the case 202. The leg 269 will be cammed away by the conical shoulder 263 and will clear the intermediate portion of the post 258 and will eventually come into engagement with the recess 262 as soon as the key container 246 has been pushed to its "home" position to again latch the key container 246 into a position in which it is latched or locked within the case. As pointed out previously, the spaces 356 are phosphorescent which makes it possible to read the indices thereon and to utilize the card 346 with a lock box 201 at night.

Now let it be assumed that the real estate agent owns a lock box 201 and that hewishes to remove it from a doorknob. The lock box is provided with a fixed shackle code selected by the agent. The agent again follows instructions 364. He again inserts the first code by following instruction 1, the shackle code by following instruction 2 using the fixed numbers 0 to 9 carried by the portions. Assuming that the shackle code is another code, a predetermined four digit number, as for example, 6 7 5 4, the card is positioned under the notch 219 with the numbers 6, 7, 5 4 being successively registered under the notch 219. The agent then follows instruction 3 and moves the card 346 so that the mark 366 adjacent the legend "shackle" underlies the notch 219. If the microprocessor 186 recognizes the two codes, the lock box 201 will again emit an audible tone. This will give the real estate agent time in which to push the case 202 upwardly on the shackle 226 to cause the conical tip 230 to engage the leg 271 to cam the U-shaped member 268 towards a shackle unlatching position in which the leg 269 is moved out of engagement with the recess 284. At the same time the solenoid 286 is energized to cause its plunger 287 to move into engagement with the ear 281. This serves to retain the leg 269 out of engagement with the recess 284 and makes it possible to retract the case 202 from the shackle 226. Shortly thereafter, the solenoid 286 will be deenergized and will permit the U-shaped member 268 to swing back into a shackle latching position.

Now let it be assumed that it is desired to reinsert the shackle 226. This can be readily accomplished by inserting the conical tip 230 into the case 202. The conical tip will engage the leg 269 and cam it out of the way and will eventually enter the hole 244 provided in the bracket 243. At approximately the same time, the leg 269 will enter the recess 284 to again latch the shackle 226 into a latched position and in which the other end of the shackle is disposed in the cap 227.

As previously pointed out there are additional instructions on the back side of the card 346 as shown in FIG. 18. Before the functions which are depicted on the back of the card can be utilized the shackle 226 must be released as indicated on the instructions in a manner hereinbefore described. Thereafter it is necessary to move the card 346 so that the "start" indicium 371 underlies the aperture 218. The card 346 is then moved so that the desired function indicia, indicia 372 to 378 underlie the aperture 218. After the function has been selected, the card 346 is moved to the "finish" indicium 381. For example, to set a function the card 346 is simply slid to the start position 371 at which time a tone will be sounded by the lock box 201. Then the card is slid to the desired function, as for example "transmit data" 376 and a tone will again be sounded. The card is then slid to the "finish" 381 and a third tone will be sounded. If an agent makes a mistake and goes to the wrong function, he need merely go to the start mark to erase that function.

In the transmission of data, the real estate agent will hold the lock box 201 adjacent a telephone set so that the tones which are emitted by the speaker 312 are transmitted through the holes 221 into the telephone receiver. After the tones cease indicating that the transmission has been completed, the real estate agent will then receive a transmission from the computer 132 indicating that the transmitted information has been received or that if it was not received or was garbled to ask the agent to retransmit the information.

If the information was properly received, the computer 132 will give the real estate broker a number representing the number of people that have actually seen the house subsequent to an earlier transmission. This is useful information because it can tell an agent whether the house has been shown and if it has been shown to obtain the printed information from the printer at the real estate board's central office. The other functions are self apparent and can be operated in a similar manner.

From the foregoing it can be seen that the card provides two very important functions. It provides two separate and independent identifiers in the form of first and second codes. One code, the first code, is carried in the code of the metalized elements 349 and the other is the second or agent's private code which is inserted into the lock box by movement of the card 346 in the manner hereinbefore described.

With such a card 346, the system has great versatility. The system can require the real estate agent to obtain an update each month of the code which is utilized in the spaces 356. This is obtained by agent supplying the code carried by the card and also by submitting his private code. Thereafter, a new combination of ten numbers would be generated by the computer 132. These new numbers would be substituted for the old numbers and would be placed in the spaces 356. This new 10 number code would again contain the real estate agent's four-digit private code. Thus the real estate agent is capable of keeping the same four-digit private code from month to month without the necessity of memorizing a new four-digit code for each month. The agent can keep his own four digit private code as long as he wishes. By utilization of such a card it has been possible to completely eliminate the need for the key pad described in the previous embodiments. This simplifies the construction of the lock box 201 and the circuitry contained therein.

The lock box 201 shown in FIGS. 12–15 has additional features and advantages over the other lock boxes disclosed in the prior embodiments. For example, with the mechanical arrangement provided in the lock box 201, it is possible to utilize inexpensive solenoids. The major mechanical force for requiring movement of the latch mechanisms to out-of-the way or unlatching positions is obtained by physical force being applied to the lock box to cause relative movement between the key container 246 and the case 202 or conversely between the shackle 226 and the case 202. This being the case, it is only necessary for the solenoid to be strong enough to keep the latching mechanisms in the out-of-the way positions during the time that the key container or the shackle are being moved.

In the lock box 201 it can be seen that the printed circuit board 301 which is utilized is shock mounted by the use of the grommets 306. It is also mounted in such a manner so that it can be readily snapped into place onto or removed from the chassis 236. It also is positioned in such a manner that it aids in holding the speaker 312 in place. The design is waterproof so that it can be utilized in relatively severe environments.

As pointed out previously, the lock box 201 and the card 346 are constructed in such a manner so that they can be utilized at night.

Figure 20:
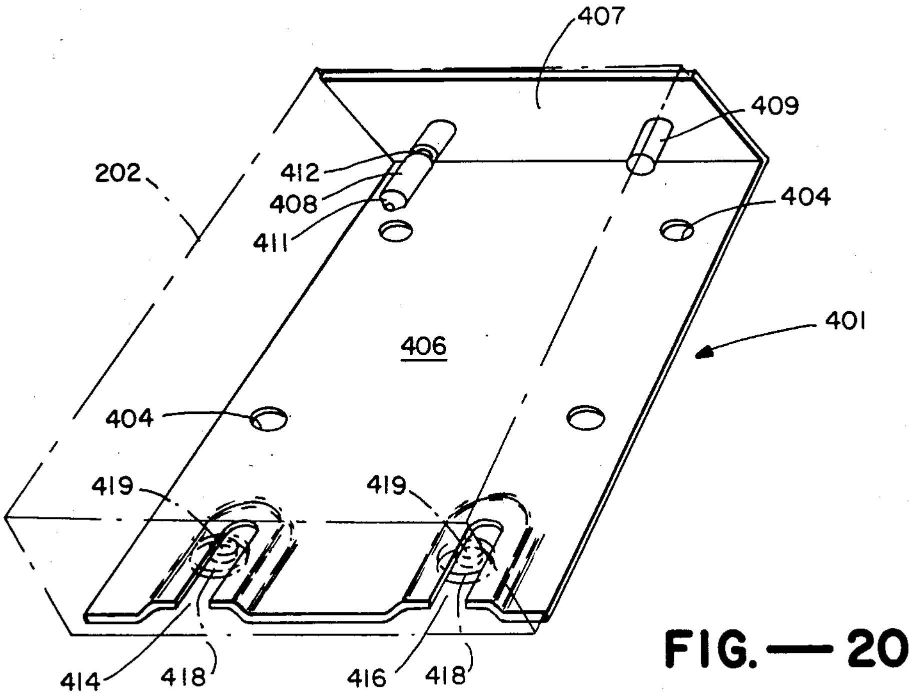
FIG. 20 is an isometric view of a bracket witha lock box shown in phantom lines utilized in conjunction therewith which is particularly suitable for non-real estate applications.

It also should be appreciated that although the system, apparatus and method has been described principally with real estate applications, the system, apparatus and method has many other applications, particularly in industrial fields. Thus in order to make the lock box 201 more versatile, the shackle 226 can be removed and a bracket 401 shown in FIG. 20 can be used in which a lock box 402 has been mounted thereon. The lock box 402 can be identical to the lock box 201 with the exception that it does not utilize a shackle 226. The bracket 401 is formed of a L-shaped member 403 of a suitable material such as steel. The bracket is provided with a plurality of holes 404 disposed on opposite sides of the rear wall 406 of the L-shaped bracket. The holes 404 are adapted to receive screws or other suitable fastening means for securing the bracket 401 to a suitable support (not shown).

The bracket 401 is provided with a forwardly extending plate 406 which is formed integral with the raar wall or plate 406 of the bracket and extends at right angles thereto. A pair of spaced apart pins 408 and 409 are mounted on the plate 407 and extend downwardly therefrom. The pins 408 and 409 correspond to the two legs **226*a* and 226*b* of the shackle 226. Thus the pin 408 is provided with a conical tip 411 and an annular recess 412 adjacent the plate 407. The rear wall or plate 406 is provided with a pair of spaced apart parallel slots 414 and 416 which open downwardly through the lower extremity of the rear wall 406. The portions of the rear plate or wall 406 adjacent the slots 414 and 416 are raised slightly as shown to accommodate heads 418 mounted on studs 419. The heads 418 are similar to the heads on carriage bolts. The studs 419 secured to the rear of the case 202 by suitable means such as welding. Thus it can be seen that when the heads 418 are slipped into the slots 414 and 416 and the pins or posts 408 and 409 enter the case 202 through the top wall 208 they will cause the same operations within the lock box 402 as occur in the lock box 201 when the shackle 226 is introduced therein. For example, the conical tip 411 will cam the latch or leg 269 to the out-of-the way position and will enter the hole 244 in the bracket 243, after which the latch or leg 269 will be moved into engagement with the recess 412 under the urging of the spring 278 to firmly latch the lock box 401 into a latched position onto the bracket 401**.

It can be seen that after the lock box 402 has been mounted on the bracket 401 in this manner, it can be operated in the same manner as the lock box 201 to gain access to the key container 246 by the use of first and second codes or similarly to remove the lock box from the bracket 401 by the use of an additional code corresponding to the shackle code. If desired a retractable key mechanism (not shown) can be provided in the key container 246. This ensures that the key will remain in close proximity to the lock box 201. This inhibits copying of the key.

In this way it can be seen that the lock box of the present invention can be utilized in many applications, as for example, providing access to keys for automobiles, trucks and the like, for obtaining access to locked storage safes, file drawers and the like and other secure areas.

It is apparent from the foregoing that there has been provided a system, apparatus and method of the above character utilizing lock boxes having unique capabilities which can be utilized in many different situations in addition to real estate applications.

What is claimed is:

1. In a card having longitudinal and transverse axes for use in a security system having a sensor, a plurality of metallic elements, said elements being spaced apart in one direction to form first and second spaced apart columns which are symmetrically positioned about the longitudinal axis said elements being spaced apart in another direction to form a plurality of spaced apart parallel rows which are symmetrically positioned about the transverse axis, at least one element being present in each of said rows, the elements which are present providing a non-erasable predetermined code assinged to the card and opaque sheets formed of a substantially rigid material disposed on opposite sides of said metallic elements and serving to conceal said metallic elements from view of the human eye, said sheets being formed of a non-metallic material to permit sensing of the metallic elements by use of the sensor.

2. A card as in claim 1 together with inidicia visible to the human eye carried by the card and having concealed therein a private code that is assigned which is unascertainable by the human eye by viewing the card.

3. A card as in claim 2 wherein the private code is a four-digit number.

4. In a card for use in a security system, at least two substantially parallel columns of spaced apart relatively rigid metallic elements disposed in spaced apart substantially parallel rows with one element always being present in each row, the absence or presence of metallic elements present in the rows providing a non-erasable code identifying the card and means encasing the metallic elements to from a card-like member, said means encasing the metallic elements being comprised of a substantially opaque relatively rigid material so as to make the metallic elements invisible to the human eye.

5. A card as in claim 4 together with a centrally disposed metallic portion joining said elements.

6. A card as in claim 4 wherein the means encasing the metallic elements is comprised of an insulating material.

7. A card as in claim 4 wherein said metallic elements are formed of a magnetic material.

8. A card as in claim 7 wherein said magnetic material is a highly ferrous sheet steel.

9. A card as in claim 4 wherein at least 15 elements are provided in each of the two columns making possible $3^{15}$ code combinations.

10. In a method for forming a card for use in a security system, providing a metallic planar sheet having longitudinal and transverse axes, removing material from the sheet to provide a plurality of metallic elements arranged in at least two spaced apart parallel columns symetrically disposed about the longitudinal axis and a plurality of spaced apart parallel rows disposed symmetrically about the transverse axis certain of the metallic elements being eliminated to place a code in the metallic elements, at least one element being present in each row and encasing the metallic elements with a opaque relatively rigid non-metallic material to form a card-like member in which the metallic elements are concealed from view of the human eye.

11. A method as in claim 10 together with the step of placing indicia on the exterior of the card-like member visible to the human eye but having incorporated therein an additional code which is unascertainable by viewing of the additional indicia.

12. A method as in claim 11 in which the code is to the base 3.

13. A card assigned to a predetermined user for use in a security system utilizing a sensor capable of sensing the presence of metal, a plurality of metallic elements providing a first code and arranged in at least two columns disposed in one direction and a plurality of spaced parallel rows disposed in another direction, at least one of said metallic elements being disposed in each row, relatively rigid opaque non-metallic encapsulating means encapsulating said metallic elements to conceal the same from viewing by the human eye, erasable indicia visible to the human eye and providing a second code disposed on the encapsulating means and positioned on the encapsulating means in a predetermined pattern in accordance with the positions of the metallic elements, said indicia being changeable periodically said indicia including a private code assigned to the predetermined user which is not ascertainable by viewing the erasable indicia on the card.

14. A card as in claim 13 wherein said first code is non-erasable.

15. In a card, first means in the form of a plurality of spaced apart metallic elements carried by the card invisible to the human eye and having a first multi-digit code incorporated therein and second means carried by the card in the form of a plurality of discrete areas substantially overlying the spaced apart metallic elements visible to the human eye and having one indicium of a plurality of indicia visible to the human eye in each of the discrete areas, each indicium having a predetermined function assigned thereto.

16. In a card which is issued to a predetermined user for use in a security system, a plurality of spaced apart metallic elements, said elements representing a predetermined code identifying the card, opaque encapsulating means encapsulating the metallic elements so that they are concealed from view of the human eye, a plurality of discrete areas substantially overlying the spaced apart metallic elements and carried by the encapsulating means and exposed to the human eye having one indicium of a plurality of indicia visible to the human eye in each of the discrete areas, each indicium having a predetermined function assigned thereto, said indicia including a private code assigned to said predetermined user which is not apparent from viewing of the card.

17. A card as in claim 16 wherein the indicia are arranged in a row.

* * * * *